(12) United States Patent
Kim

(10) Patent No.: US 11,831,025 B2
(45) Date of Patent: Nov. 28, 2023

(54) CATALYST, PREPARATION METHOD THEREFOR, ELECTRODE COMPRISING SAME, MEMBRANE-ELECTRODE ASSEMBLY, AND FUEL CELL

(71) Applicant: KOLON INDUSTRIES, INC., Seoul (KR)

(72) Inventor: Jung-Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 65 days.

(21) Appl. No.: 16/957,530

(22) PCT Filed: Dec. 3, 2018

(86) PCT No.: PCT/KR2018/015195
§ 371 (c)(1),
(2) Date: Jun. 24, 2020

(87) PCT Pub. No.: WO2019/132281
PCT Pub. Date: Jul. 4, 2019

(65) Prior Publication Data
US 2021/0020956 A1 Jan. 21, 2021

(30) Foreign Application Priority Data

Dec. 26, 2017 (KR) .................. 10-2017-0179021
Nov. 28, 2018 (KR) .................. 10-2018-0149343

(51) Int. Cl.
*H01M 4/92* (2006.01)
*H01M 4/86* (2006.01)
*H01M 8/1004* (2016.01)

(52) U.S. Cl.
CPC ......... *H01M 4/926* (2013.01); *H01M 4/8673* (2013.01); *H01M 8/1004* (2013.01)

(58) Field of Classification Search
None
See application file for complete search history.

(56) References Cited

U.S. PATENT DOCUMENTS 7,208,437 B2 * 4/2007 Renock .................. B01J 31/30
502/154
8,221,937 B2 7/2012 Dai
(Continued)

FOREIGN PATENT DOCUMENTS

CN 1512611 A 7/2004
CN 101282904 A 10/2008
(Continued)

OTHER PUBLICATIONS

Machine translation of Gun et al., KR 20170054145A (Year: 2017).*

(Continued)

*Primary Examiner* — Coris Fung
*Assistant Examiner* — Keling Zhang
(74) *Attorney, Agent, or Firm* — Harvest IP Law, LLP

(57) ABSTRACT

A catalyst, a preparation method therefor, an electrode containing the catalyst, a membrane-electrode assembly, and a fuel cell are disclosed. The catalyst contains a support; metal particles supported by the support; and a coating layer located on the metal particles, and includes any one selected from the group consisting of phthalocyanine, M-phthalocyanine (wherein M is a transition metal) and a mixture thereof. The catalyst has improved durability since a coating layer is formed on the surface of a commercial catalyst or a conventional catalyst through a relatively easy method without separate treatment. A carbon coating layer formed by post-treating a catalyst including the coating layer further improves durability. Material transfer ability and perfor- (Continued)

mance are also improved by a carbon nanofiber or a carbon nanotube generated during post-treatment.

13 Claims, 16 Drawing Sheets

(56) References Cited

U.S. PATENT DOCUMENTS

| | | | |
|---|---|---|---|
| 2005/0221975 | A1 | 10/2005 | Renock |
| 2006/0269827 | A1 | 11/2006 | Liu |
| 2010/0183943 | A1 | 7/2010 | Ugawa et al. |
| 2010/0183950 | A1 | 7/2010 | Dai |
| 2013/0344414 | A1 | 12/2013 | Lee et al. |

FOREIGN PATENT DOCUMENTS

| | | | |
|---|---|---|---|
| CN | 102315461 A1 | | 1/2012 |
| CN | 102732912 A | | 10/2012 |
| CN | 103501901 A | | 1/2014 |
| CN | 103515621 A | | 1/2014 |
| CN | 106856243 A | | 6/2017 |
| JP | 2005056776 A | | 3/2005 |
| JP | 2009208061 A | | 9/2009 |
| JP | 2014512251 A | | 5/2014 |
| JP | 2017525103 A | | 8/2017 |
| JP | 2017208204 A | | 11/2017 |
| KR | 10-2007-0035710 A | | 4/2007 |
| KR | 20070035710 A1 | | 4/2007 |
| KR | 10-2007-0055119 A | | 5/2007 |
| KR | 10-2011-0070353 A | | 6/2011 |
| KR | 10-2013-0001876 A | | 1/2013 |
| KR | 10-2014-0003309 A | | 1/2014 |
| KR | 20140027106 A | | 3/2014 |
| KR | 10-2017-0054145 A1 | | 5/2017 |
| WO | 2007061248 A1 | | 5/2007 |

OTHER PUBLICATIONS

Machine translation of Chan et al., KR 20070035710 A (Year: 2007).*
Kim et al., Vertically aligned carbon nanotubes grown by pyrolysis of iron, cobalt, and nickel phthalocyanines, J. Phys. Chem., 2003, 107, 9249-9255 (Kim) (Year: 2003).*
International Search Report for PCT/KR2018/015195 dated Apr. 19, 2019 [PCT/ISA/210].
Counterpart Korean office action dated Jun. 9, 2021.
CN office action dated Dec. 3, 2021.
"Resonant Acoustic Mixing and its applications to energetic materials",Hope Karl S. et al.
EP search report dated Jan. 11, 2022.
Counterpart Japanese office action dated Jun. 23, 2021.

* cited by examiner

CATALYST, PREPARATION METHOD THEREFOR, ELECTRODE COMPRISING SAME, MEMBRANE-ELECTRODE ASSEMBLY, AND FUEL CELL

CROSS REFERENCE TO RELATED APPLICATIONS

This application is a National Stage of International Application No. PCT/KR2018/015195 filed Dec. 3, 2018, claiming priority based on Korean Patent Application No. 10-2017-0179021 filed Dec. 26, 2017 and Korean Patent Application No. 10-2018-0149343 filed Nov. 28, 2018.

TECHNICAL FIELD

The present disclosure relates to a catalyst, a method of preparing the same, an electrode including the same, a membrane-electrode assembly and a fuel cell. More particularly, the present disclosure relates to a catalyst that is imparted with improved durability by forming a coating layer on the surface of a commercially available catalyst or a conventional catalyst through a relatively easy method without a separate treatment, is imparted with further improved durability by forming a carbon coating layer through post-treatment of the catalyst including the coating layer, and is imparted with improved mass transfer ability and performance through carbon nanofibers or carbon nanotubes produced during the post-treatment process, a method of preparing the same, an electrode including the same, a membrane-electrode assembly, and a fuel cell.

BACKGROUND ART

A fuel cell is an electric-power-generating system for directly converting the energy from a chemical reaction between oxygen and hydrogen contained in a hydrocarbon-based material such as methanol, ethanol, or natural gas into electrical energy. A typical example of such a fuel cell is a polymer electrolyte membrane fuel cell (PEMFC). The PEMFC is in the spotlight as a next-generation energy source, and research into the commercialization thereof is actively being conducted owing to advantages such as environmental friendliness in the automotive field.

In the fuel cell system, a membrane-electrode assembly (MEA) that substantially generates electricity has a structure in which a polymer electrolyte membrane containing a proton-conducting polymer is interposed between an anode (also called a "fuel electrode" or an "oxidation electrode") and a cathode (also called an "air electrode" or a "reduction electrode"). Each electrode is formed using a mixture of a catalyst, an ionomer, a solvent and an additive, and among these constituent components, the catalyst is a major factor that determines the activity and durability of the fuel cell.

As catalysts used in the oxidation electrode and the reduction electrode, Pt/C catalysts, including platinum nanoparticles supported on a carbon support having a large specific surface area and excellent electrical conductivity, are most widely used. However, Pt/C catalysts are prepared from pure platinum, which is an expensive metal, thus being a major factor that increases the price of catalysts. Platinum oxide is produced when oxygen is adsorbed on the platinum surface due to the reduction reaction of oxygen at the cathode. At this time, generated overvoltage causes about 30% of energy loss, which is a main factor delaying commercialization.

Further, in response to the recent requirement for increased durability, in addition to the requirements for fuel cells for transportation, highly crystalline carbon such as graphitized carbon, carbon nanotubes and graphene as a support has been used to increase durability. However, even in this case, when the fuel cell is driven, problems associated with aggregation of catalyst particles or desorption thereof from the support occur, which are basically due to thermodynamic characteristics, in which catalysts such as platinum are dissolved through oxygen species, aggregation of platinum particles and corrosion of the carbon support.

DISCLOSURE

Technical Problem

Therefore, it is one object of the present disclosure to provide a catalyst that is imparted with improved durability by forming a coating layer on the surface of a commercially available catalyst or a conventional catalyst through a relatively easy method without a separate treatment, is imparted with further improved durability by forming a carbon coating layer through post-treatment of the catalyst including the coating layer, and is imparted with improved mass transfer ability and performance by carbon nanofibers or carbon nanotubes produced during the post-treatment process.

It is another object of the present disclosure to provide a method of preparing the catalyst.

It is another object of the present disclosure to provide an electrode including the catalyst.

It is another object of the present disclosure to provide a membrane-electrode assembly including the electrode.

It is another object of the present disclosure to provide a fuel cell including the membrane-electrode assembly.

Technical Solution

In accordance with one aspect of the present disclosure to solve the technical problems, provided is a catalyst including a support, a metal particle supported on the support, and a coating layer disposed on a surface of the metal particle and a surface of the support, the coating layer including any one selected from the group consisting of phthalocyanine, M-phthalocyanine (wherein M is a transition metal), and a mixture thereof.

In another aspect of the present disclosure, provided is a catalyst including a support, a metal particle supported on the support, and a coating layer disposed on a surface of the metal particle and a surface of the support, wherein the coating layer is a carbon coating layer including carbon doped with a hetero element.

The carbon coating layer may be formed by carbonizing any one selected from the group consisting of phthalocyanine, M-phthalocyanine (wherein M is a transition metal), and a mixture thereof.

The hetero element may be any one selected from the group consisting of nitrogen, a transition metal and a combination thereof.

The coating layer may further include any one selected from the group consisting of carbon nanofibers, carbon nanotubes and a mixture thereof on all or part of a surface of the carbon coating layer.

The carbon coating layer may be formed by carbonizing any one selected from the group consisting of phthalocyanine, M-phthalocyanine (wherein M is a transition metal), and a mixture thereof.

The any one selected from the group consisting of carbon nanofibers, carbon nanotubes and a mixture thereof may be one grown from the carbon coating layer.

The carbon nanofibers or carbon nanotubes may have a length of 50 nm to 5,000 nm.

The transition metal M of the M-phthalocyanine may be any one selected from the group consisting of Fe, Co, Cu, Ti, Ni, Zn, Mn and a combination thereof.

The coating layer may have a thickness of 0.1 nm to 7 nm.

A content of the coating layer may be 5% to 30% by weight based on a total weight of the catalyst.

A content of the any one selected from the group consisting of carbon nanofibers, carbon nanotubes and a mixture thereof may be 1% to 10% by weight based on a total weight of the catalyst.

The catalyst may further include a second catalyst including a support and a metal particle supported on the support.

In another aspect of the present disclosure, provided is a method for preparing a catalyst, the method comprising mixing a metal particle supported on a support with any one selected from the group consisting of phthalocyanine, M-phthalocyanine (wherein M is a transition metal) and a mixture thereof, thereby coating the any one selected from the group consisting of phthalocyanine, M-phthalocyanine and a mixture thereof on a surface of the metal particle and a surface of the support.

The mixing may include mixing the metal particle supported on the support with the any one selected from the group consisting of phthalocyanine, M-phthalocyanine and a mixture thereof in a solid phase by means of any one selected from the group consisting of a ball mill, a powder mixer and a resonant acoustic mixer.

The resonant acoustic mixer may conduct resonant vibratory mixing by applying a low-frequency acoustic energy to the metal particle supported on the support and the any one selected from the group consisting of phthalocyanine, M-phthalocyanine and a mixture thereof.

The low-frequency acoustic energy may have a frequency of 10 to 100 Hz.

The resonant vibratory mixing may be carried out for 30 seconds to 30 minutes by applying an acceleration of 10 to 100 G to the metal particle supported on the support and the any one selected from the group consisting of phthalocyanine, M-phthalocyanine and a mixture thereof.

The method may further include heat-treating the any one selected from the group consisting of phthalocyanine, M-phthalocyanine and a mixture thereof to form a carbon coating layer containing carbon doped with a hetero element.

When the any one selected from the group consisting of phthalocyanine, M-phthalocyanine and a mixture thereof is carbonized through the heat treatment, any one selected from the group consisting of carbon nanofibers, carbon nanotubes and a mixture thereof may be grown on all or part of the carbon coating layer.

The heat treatment may be carried out at 400° C. to 800° C. for 5 minutes to 60 minutes.

The heat treatment may be carried out under an argon or argon-hydrogen ($H_2$—Ar) atmosphere.

In another aspect of the present disclosure, provided is an electrode including the catalyst and an ionomer.

In another aspect of the present disclosure, provided is a membrane-electrode assembly including an anode and a cathode facing each other, and an ion exchange membrane interposed between the anode and the cathode, wherein any one selected from the group consisting of the anode, the cathode and a combination thereof includes the electrode.

In another aspect of the present disclosure, provided is a fuel cell including the membrane-electrode assembly.

Advantageous Effects

The catalyst is imparted with improved durability by forming a coating layer on the surface of a commercially available catalyst or a conventional catalyst through a relatively easy method without a separate treatment, is imparted with further improved durability by forming a carbon coating layer through post-treatment of the catalyst including the coating layer, and is imparted with improved mass transfer ability and performance by carbon nanofibers or carbon nanotubes produced during the post-treatment process.

BEST MODE

Figure 1:
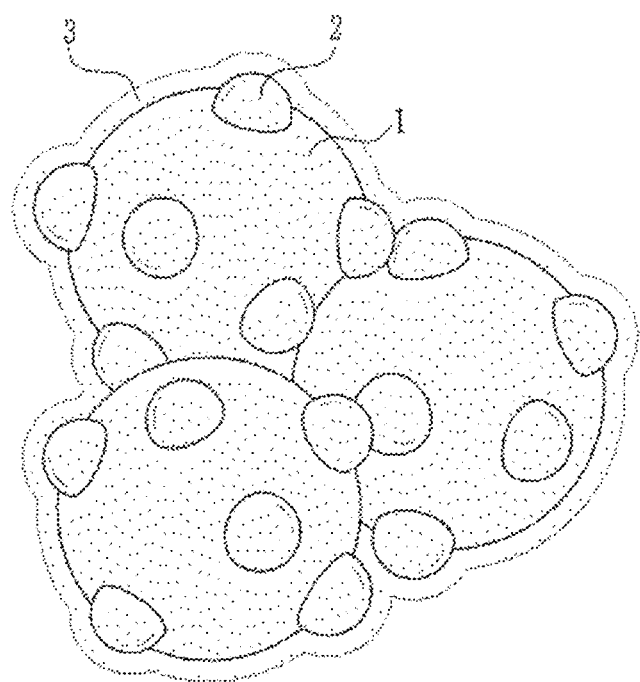
FIG. 1 is a schematic diagram illustrating a catalyst according to an embodiment of the present disclosure.

Hereinafter, the present disclosure will be described in more detail with reference to specific examples. However, the following examples are provided only for better understanding of the present disclosure and should not be construed as limiting the scope of the present disclosure, and the present disclosure is defined by the scope of the claims described below.

The catalyst according to an embodiment of the present disclosure includes a support, a metal particle supported on the support, and a coating layer disposed on the surfaces of the metal particle and support.

The support may be selected from carbon-based supports, porous inorganic oxides such as zirconia, alumina, titania, silica and ceria, and zeolite and the like. The carbon-based support may be selected from super P, carbon fibers, carbon sheets, carbon black, Ketjen black, acetylene black, carbon nanotubes (CNTs), carbon spheres, carbon ribbon, fullerene, activated carbon, and combinations thereof, but the present disclosure is not limited thereto, and any support usable in the art can be used without limitation.

The metal particle supported on the support may be positioned on the surface of the support, or may penetrate into the support while filling the pores in the support.

Any one that can be used as a catalyst in a hydrogen oxidation reaction and/or an oxygen reduction reaction can be used as the metal particle. Preferably, a platinum-based metal is used.

The metal particle may include any one selected from the group consisting of platinum (Pt), palladium (Pd), ruthenium (Ru), iridium (Ir), osmium (Os), a platinum-M alloy wherein M is selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh), and a combination thereof. More preferably, a combination of two or more metals selected from the group of platinum-based catalyst metals may be used, but the present disclosure is not limited thereto, and any platinum-based catalyst metal that can be used in the art may be used without limitation.

The metal particle may be present in an amount of 20 to 80% by weight with respect to the total weight of the catalyst. When the content of the metal particle is less than 20% by weight, the activity may be deteriorated and when the content of the metal particle exceeds 80% by weight, the active area may be decreased and catalytic activity may be deteriorated due to aggregation of the catalyst particles.

The coating layer may be a first coating layer containing any one selected from the group consisting of phthalocyanine, M-phthalocyanine (wherein M is a transition metal) and a mixture thereof.

In addition, the coating layer is a carbon coating layer containing carbon doped with a hetero element, or a second coating layer comprising a carbon coating layer containing a carbon doped with a hetero element and anyone selected from the group consisting of carbon nanofibers, carbon nanotubes and a mixture thereof on all or part of the surface of the carbon coating layer.

The coating layer serves to cover and protect the surface of the metal particles and the support, thereby preventing the metal particles such as platinum from being dissolved by oxygen species, preventing aggregation and desorption of the metal particles and corrosion of the support, and ultimately improving the durability of the catalyst.

In addition, the second coating layer may include any one selected from the group consisting of carbon nanofibers, carbon nanotubes and a mixture thereof formed on all or part of the surface of the carbon coating layer depending on the content of the phthalocyanine precursor. The second coating layer containing carbon doped with a hetero element serves as a protective layer that covers and protects the surface of the metal particles to prevent aggregation and desorption of the metal particles and corrosion of the support and to improve the durability of the catalyst. The second coating layer can improve the performance and durability of the catalyst by improving mass transfer or the like through any one selected from the group consisting of carbon nanofibers, carbon nanotubes and a mixture thereof, present on all or part of the surface of the carbon coating layer.

The phthalocyanine is a macrocyclic compound that is composed of four isoindole molecules each linked via an "—N=" bridge-shaped ring and may form M-phthalocyanine, which is a complex salt, in which two hydrogen atoms at the center thereof are substituted with another transition metal, wherein M may be any transition metal selected from the group consisting of Fe, Co, Cu, Ti, Ni, Zn, Mn and a combination thereof.

Meanwhile, the first coating layer containing any one selected from the group consisting of phthalocyanine, M-phthalocyanine, and a mixture thereof is carbonized through heat treatment to form the carbon coating layer containing carbon doped with a hetero element, or the second coating layer containing any one selected from the group consisting of carbon nanofibers, carbon nanotubes and a mixture thereof present on all or part of the surface of the carbon coating layer. At this time, any one selected from the group consisting of carbon nanofibers, carbon nanotubes and a mixture thereof may contain carbon doped with a hetero element.

Since the carbon doped with a hetero element is formed by carbonizing any one selected from the group consisting of the phthalocyanine, M-phthalocyanine and a mixture thereof, the hetero element is a nitrogen atom included in the phthalocyanine, or a nitrogen atom or a transition metal included in the M-phthalocyanine, the transition metal may be a reduced form or an oxide form, and a part of the transition metal may be adjacent to the metal particle to thus form a metal alloy.

The second coating layer containing carbon doped with a hetero element may include the nitrogen atom derived from phthalocyanine in an amount of 3 to 10 atomic % with respect to all of the carbon coating layer, and any one selected from the group consisting of carbon nanofibers, carbon nanotubes and a mixture thereof.

The second coating layer containing carbon doped with a hetero element may include the transition metal derived from M-phthalocyanine in an amount of 1 to 3 atomic % with respect to all of the carbon coating layer, and any one selected from the group consisting of carbon nanofibers, carbon nanotubes and a mixture thereof.

The any one selected from the group consisting of carbon nanofibers, carbon nanotubes and a mixture thereof can be grown in three dimensions on the coating layer of the surface of the catalyst upon carbonization of any one selected from the group consisting of phthalocyanine, M-phthalocyanine and a mixture thereof. The any one selected from the group consisting of carbon nanofibers, carbon nanotubes and a mixture thereof can further improve mass transfer capacity and performance.

The length of the carbon nanofibers or carbon nanotubes may be 50 nm to 5,000 nm, specifically 200 nm to 1,000 nm. When the length of the carbon nanofibers or carbon nanotubes is less than 50 nm, the improvement in mass transfer and performance may be insignificant and thus the effect of the present disclosure may not be obtained well, and when the length exceeds 5,000 nm, performance may be deteriorated due to an increase in a portion having no catalyst.

Any one selected from the group consisting of carbon nanofibers, carbon nanotubes and a mixture thereof may be present in an amount of 1% to 10% by weight with respect to the total weight of the catalyst, specifically 2% to 7% by weight. When the content of the any one selected from the group consisting of carbon nanofibers, carbon nanotubes and a mixture thereof is less than 1% by weight with respect to the total weight of the catalyst, the effect of the present disclosure may be insignificant, and when the content exceeds 10% by weight, performance may be deteriorated.

The thickness of the coating layer may vary depending on the type of metal particles and the type of the support, and the thickness of the coating layer can be controlled by adjusting the content of any one selected from the group consisting of phthalocyanine, M-phthalocyanine and a mixture thereof. The thickness of the coating layer is preferably as thin as possible, may be 0.1 nm to 7 nm, specifically 1 nm to 3 nm. By making the thickness of the coating layer as thin as possible, durability can be improved without deteriorating the activity of the catalyst.

The content of the coating layer may be 5% to 30% by weight, specifically, 7% to 23% by weight, based on the total weight of the catalyst. When the content of the coating layer is less than 5% by weight based on the total weight of the catalyst, an area where the metal particles are not coated may occur, and when the content exceeds 30% by weight, the activity of the catalyst may be deteriorated due to the great thickness of the coating layer and phthalocyanine or M-phthalocyanine may aggregate (agglomerate).

Figure 2:
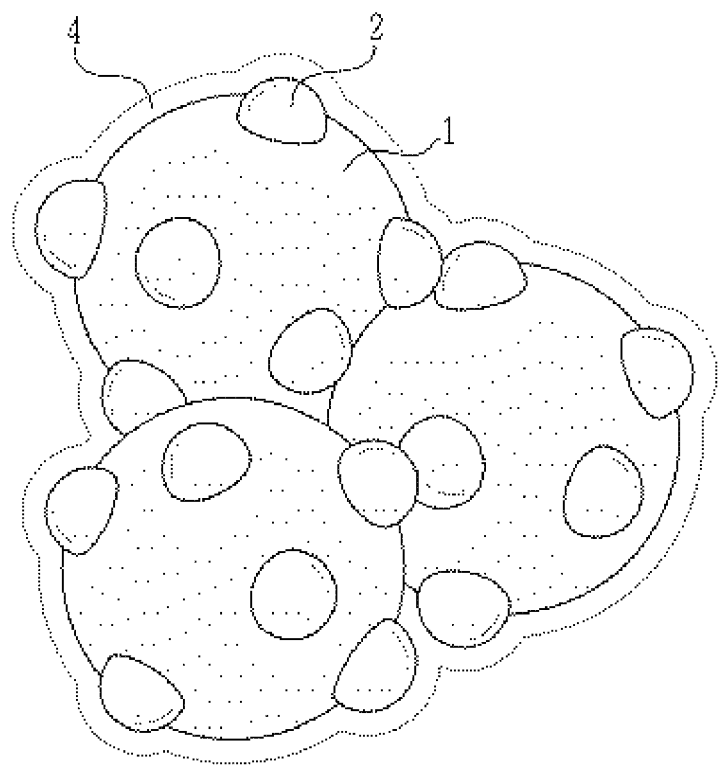
FIG. 2 is a schematic diagram illustrating a catalyst according to another embodiment of the present disclosure.
Figure 3:
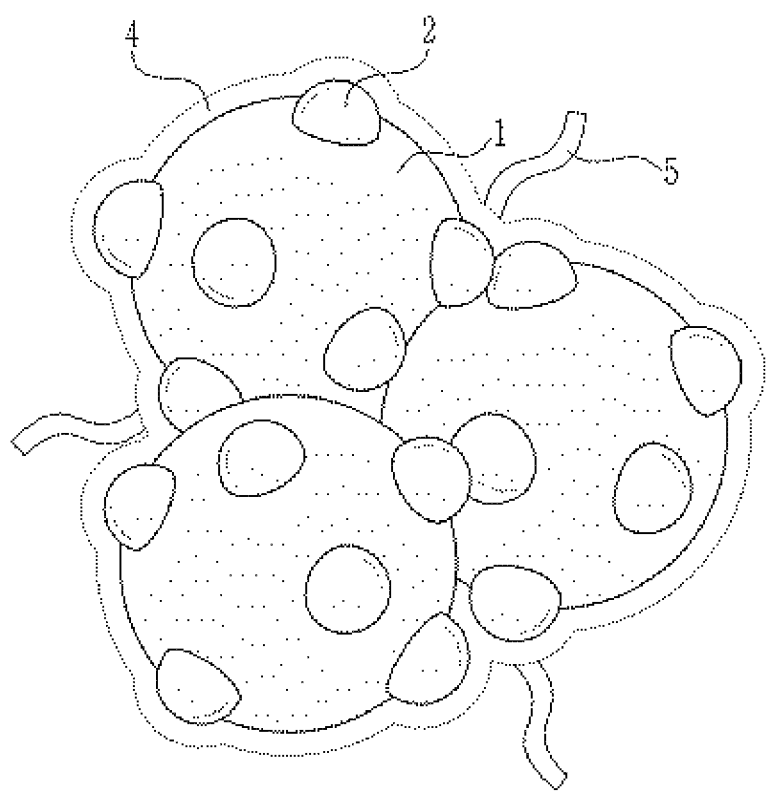
FIG. 3 is a schematic diagram illustrating a catalyst having a different shape according to another embodiment of the present disclosure.

FIGS. 1 to 3 are schematic diagrams illustrating respective embodiments of the coating layer.

Referring to FIG. 1, the metal particle 2 is supported on the support 1, and a coating layer 3 containing any one selected from the group consisting of phthalocyanine, M-phthalocyanine, and a mixture thereof covers the surface of the support 1 and the surface of the metal particle 2.

In addition, referring to FIG. 2, the metal particle 2 is supported on the support 1, and a carbon coating layer 4 containing carbon doped with a hetero element covers the surface of the support 1 and the surface of the metal particle 2.

In addition, referring to FIG. 3, the catalyst shown in FIG. 2 further includes any one selected from the group consisting of carbon nanofibers, carbon nanotubes and a mixture thereof 5 on all or part of the surface of the carbon coating layer 4 containing carbon doped with a hetero element.

Meanwhile, the catalyst may further include a second catalyst not including the coating layer, in addition to the first catalyst including the coating layer. That is, the second catalyst may include the support and the metal particle supported on the support, and this configuration has been described above and thus a repeated description thereof is omitted.

A method for preparing a catalyst according to another embodiment of the present disclosure includes mixing a metal particle supported on a support with any one selected from the group consisting of phthalocyanine, M-phthalocyanine (wherein M is a transition metal) and a mixture thereof, thereby coating any one selected from the group consisting of phthalocyanine, M-phthalocyanine and a mixture thereof on the surface of the metal particle and the surface of the support.

The metal particle supported on the support may be a commercially available product or may be prepared by supporting the metal particle on the support. Since the process of supporting the metal particle on the support is well known in the art and will thus be obvious to those skilled in the art, a detailed description thereof will be omitted.

Specifically, the mixing may be mixing the metal particle supported on the support with any one selected from the group consisting of phthalocyanine, M-phthalocyanine, and a mixture thereof in a solid phase.

Conventional techniques for coating the catalyst include mixing the catalyst with a material for forming a coating layer in an aqueous solution phase, and specifically, this process includes a series of processes of performing dispersion in an aqueous solution and drying, thus causing damage to the catalyst and loss thereof during the preparation. In addition, the catalyst prepared through the method includes a coating layer, thus having improved durability, but the process may be complicated and the yield may be significantly deteriorated.

Meanwhile, the method of forming the coating layer of the present disclosure is performed in a solid phase, thereby preventing damage and loss of the catalyst in the process of forming the coating layer, and uniformly coating the surface of the metal particles with a smaller amount of any one selected from the group consisting of phthalocyanine, M-phthalocyanine and a mixture thereof.

Specifically, the coating layer may be formed by mixing the metal particle supported on the solid-phase support with any one selected from the group consisting of phthalocyanine, M-phthalocyanine and a mixture thereof using any one selected from the group consisting of a ball mill, a powder mixer and a resonant acoustic mixer, preferably using a resonant acoustic mixer.

In the case of using the ball mill, the catalyst may be deformed, and in the case of using the powder mixer, a coating effect may not be sufficiently achieved. Meanwhile, in the case of using the resonant acoustic mixer, a more uniform coating result can be obtained within a short time.

Specifically, the resonant acoustic mixer conducts resonant vibratory mixing by applying low-frequency acoustic energy to the metal particles supported on the support and any one selected from the group consisting of phthalocyanine, M-phthalocyanine and a mixture thereof.

The resonant vibratory mixing may be carried out by applying low-frequency acoustic energy, and the low-frequency acoustic energy is linear or spherical energy propagated through a tangible medium in a frequency range of 10 to 20000 Hz. In the present disclosure, in order to coat the surface of the support and the surface of the metal particle supported on the support to a nano-thickness with any one selected from the group consisting of the phthalocyanine, M-phthalocyanine and a mixture thereof, a low-frequency acoustic energy having a frequency of 10 to 100 Hz, specifically, a frequency of 50 to 70 Hz, can be used.

In addition, the resonant vibratory mixing may be carried out by applying an acceleration of 10 to 100 G, specifically 40 to 100 G, to the metal particle supported on the support and any one selected from the group consisting of phthalocyanine, M-phthalocyanine and a mixture thereof (wherein G represents a gravitational acceleration, for example, 10 G means 10 times gravitational acceleration).

When the acceleration is less than 10 G, an unmixed region may exist and performance may be deteriorated due to non-coating, and when the acceleration exceeds 100 G, there may be problems such as aggregation of phthalocyanine or M-phthalocyanine, or changed mixing conditions and deteriorated performance due to phase separation or heating.

The method for applying the low-frequency acoustic energy in the frequency region and the acceleration to the mixture is not particularly limited in the present disclosure, and any method known in the art can be used. For example, when Resodyn® is used as the resonant acoustic mixer, the acoustic energy is supplied by the periodic linear displacement of the container filled with the mixture, and for this purpose, a plurality of mechanical or electronic transducer placements is used, including more specifically variable elastic members such as oscillator drives and springs for transferring vibration and acceleration to the container. For information on the resonant acoustic mixer, reference may be made to U.S. Pat. No. 7,188,993 and US Patent Laid-open No. 2010-0294113.

The resonant vibratory mixing may be performed for 30 seconds to 30 minutes, and specifically, for a short period of time from 1 minute to 10 minutes. When the time of the resonant vibratory mixing is less than 30 seconds, mixing is insufficient or desired coating properties may not be achieved, and when the time exceeds 30 minutes, the sample or composition may be changed.

Meanwhile, the method for preparing the catalyst may further include heat-treating any one selected from the group consisting of phthalocyanine, M-phthalocyanine and a mixture thereof to form a carbon coating layer containing carbon doped with a hetero element.

In this case, when any one selected from the group consisting of phthalocyanine, M-phthalocyanine and a mixture thereof is carbonized through heat treatment, any one selected from the group consisting of carbon nanofibers, carbon nanotubes and a mixture thereof can be grown on all or part of the carbon coating layer.

Figure 4:
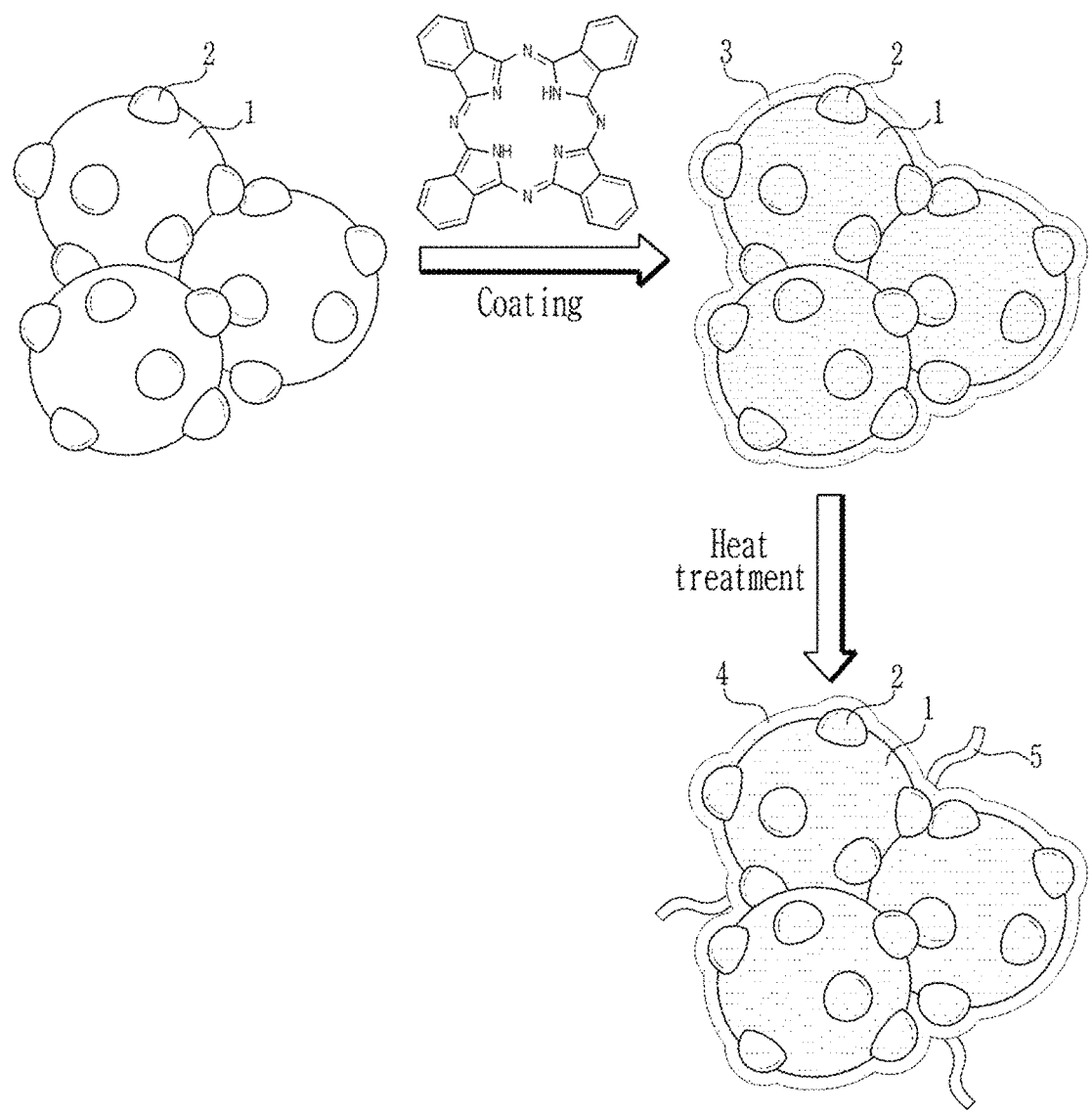
FIG. 4 is a schematic diagram illustrating the overall process of a method of preparing the catalyst according to one embodiment of the present disclosure.

FIG. 4 is a schematic diagram illustrating the overall process of a method of preparing the catalyst.

Referring to FIG. 4, a coating layer 3 including any one selected from the group consisting of phthalocyanine, M-phthalocyanine and a mixture thereof is formed on the surface of the metal particle 2 and the surface of the support 1. Then, the any one selected from the group consisting of phthalocyanine, M-phthalocyanine and a mixture thereof is heat-treated to form a carbon coating layer 4 containing carbon doped with a hetero element. At this time, when the any one selected from the group consisting of phthalocyanine, M-phthalocyanine and a mixture thereof is carbonized through heat treatment, any one selected from the group consisting of carbon nanofibers, carbon nanotubes and a mixture thereof 5 can be grown in all or part of the carbon coating layer 4.

Specifically, in the coating layer containing any one selected from the group consisting of phthalocyanine, M-phthalocyanine and a mixture thereof, the any one selected from the group consisting of phthalocyanine, M-phthalocyanine and a mixture thereof can be carbonized through heat treatment, and can thus be converted to carbon.

Through the heat treatment, the carbon coating layer containing carbon doped with a hetero element can be formed with strong bonding strength on the metal particle supported on the support and the support, and any one selected from the group consisting of carbon nanofibers, carbon nanotubes and mixtures thereof can be formed on all or part of the surface of the carbon coating layer.

That is, in the heat treatment step, any one selected from the group consisting of carbon nanofibers, carbon nanotubes and a mixture thereof can be grown in three dimensions according to the type, content and post-treatment conditions of any one selected from the group consisting of phthalocyanine, M-phthalocyanine and a mixture thereof, so the mass transfer ability and performance of the catalyst can be improved.

In addition, the coating thickness of the coating layer and the length, diameter and structure of any one selected from the group consisting of carbon nanofibers, carbon nanotubes and a mixture thereof can be controlled by changing the kind, content, heat-treatment temperature, heat-treatment time and heat-treatment atmosphere of any one selected from the group consisting of phthalocyanine, M-phthalocyanine and a mixture thereof.

Specifically, the heat treatment may be performed under an inert gas or reducing gas mixture atmosphere. The inert gas may be any one selected from the group consisting of nitrogen, helium, argon, neon, krypton, xenon, radon, and a mixture gas thereof, and the reducing gas may be a hydrogen mixture gas.

For example, the heat treatment may be performed under an argon atmosphere or an argon-hydrogen mixture atmosphere. In addition, when the heat treatment is performed under the argon-hydrogen mixture atmosphere, reduced-form or oxide-form hetero-particles of the transition metal may be partially doped to the carbon depending on the type of M-phthalocyanine. The partial transition metal may be adjacent to metal particles to thus form a metal alloy.

Regarding the argon-hydrogen mixture gas, the hydrogen may have a content of 2% by volume to 20% by volume with respect to the total volume of the mixture gas, and specifically 5% by volume to 15% by volume with respect thereto. When the content of the hydrogen is less than 2% by volume with respect to the total volume of the argon-hydrogen mixture gas, the growth of any one selected from the group consisting of carbon nanofibers, carbon nanotubes and a mixture thereof is inhibited, or reduction of the transition metal is inhibited, thus failing to obtain the effect of performance improvement, and when the content exceeds 20% by weight, there may be problems of deteriorated performance due to loss of the existing catalyst caused by the growth of metal particles and the loss of support, as well as the risk of fire and explosions during processing.

The heat treatment may be performed at a temperature of 400° C. to 800° C., specifically, at a temperature of 500° C. to 700° C. When the heat-treatment temperature is less than 400° C., the stability of the carbonized carbon may be deteriorated, and when the temperature exceeds 800° C., activity of the catalyst due to growth of metal particles or the like may be deteriorated.

The heat treatment may be performed for 5 minutes to 60 minutes, specifically 5 minutes to 30 minutes, and more specifically 10 minutes to 40 minutes. When the heat treatment is performed for less than 5 minutes, the effect of the heat treatment may not be obtained, and when the heat treatment is performed for more than 60 minutes, the activity of the catalyst may be deteriorated due to the growth of metal particles and the excessive growth of any one selected from the group consisting of carbon nanofibers, carbon nanotubes and a mixture thereof.

An electrode according to another embodiment of the present disclosure includes the catalyst and an ionomer mixed with the catalyst.

The ionomer may be a cation conductor having a group conducting a cation, such as a proton, or an anion conductor having a group conducting an anion, such as a hydroxy ion, carbonate or bicarbonate.

The cation-conducting group may be any one selected from the group consisting of a sulfonic acid group, a carboxyl group, a boronic acid group, a phosphoric acid groups, an imide group, a sulfonimide group, a sulfonamide group and a combination thereof, and is generally a sulfonic acid group or a carboxyl group.

Examples of the cation conductor include: fluorine-based polymers having the cation-conducting group and containing fluorine in the main chain thereof; hydrocarbon-based polymers such as benzimidazole, polyamide, polyamideimide, polyimide, polyacetal, polyethylene, polypropylene, acrylic resin, polyester, polysulfone, polyether, polyetherimide, polyethersulfone, polyetherimide, polycarbonate, polystyrene, polyphenylene sulfide, polyether ether ketone, polyether ketone, polyaryl ether sulfone, polyphosphazene or polyphenylquinoxaline; partially fluorinated polymers such as polystyrene-graft-ethylene-tetrafluoroethylene copolymers or polystyrene-graft-polytetrafluoroethylene copolymer; sulfone imide and the like.

More specifically, when the cation conductor is a proton cation conductor, the polymers described above may include, at the side chain thereof, a cation-conducting group selected from the group consisting of a sulfonic acid group, a carboxylic acid group, a phosphoric acid group, a phosphonic acid group and a derivative thereof. Specific examples thereof include, but are not limited to: fluorinated polymers including poly(perfluorosulfonic acid), poly(perfluorocarboxylic acid), copolymers of fluorovinyl ether and tetrafluoroethylene containing a sulfonic acid group, defluorinated sulfide polyether ketone or mixtures thereof; hydrocarbon-based polymers such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and mixtures thereof.

In addition, in the cation conductor, H in the cation exchange group at the side chain end may be substituted with Na, K, Li, Cs or tetrabutylammonium. When H in the cation exchange group at the end of the side chain is substituted with Na, NaOH is used in the process of preparing the carbon structure composition, and when H is substituted with tetrabutylammonium, tetrabutylammonium hydroxide is used. K, Li, or Cs can be substituted using suitable compounds. The substitution method is widely known in the art and thus a detailed description thereof will be omitted.

The cation conductor may be used in the form of a single substance or a mixture, and may be optionally used together with a non-conductive compound for the purpose of further improving adhesion with the ion exchange membrane. It is preferable to use an amount adjusted to suit the intended use.

The non-conductive compound may include at least one selected from the group consisting of polytetrafluoroethylene (PTFE), tetrafluoroethylene-hexafluoropropylene copolymers (FEP), tetrafluoroethylene-perfluoroalkyl vinyl ether copolymers (PFA), ethylene/tetrafluoroethylene (ETFE), ethylene chlorotrifluoro-ethylene copolymers (ECTFE), polyvinylidene fluoride, polyvinylidene fluoride-hexafluoropropylene copolymers (PVdF-HFP), dodecylbenzenesulfonic acid and sorbitol.

The anion conductor is a polymer capable of transporting anions such as hydroxy ions, carbonates or bicarbonates, commercially available anion conductors include hydroxide or halide (generally chloride)-type anion conductors, and the anion conductors can be used for industrial water purification, metal separation, carbon structure processes and the like.

The anion conductor that is generally used is a polymer doped with metal hydroxide. Specifically, the anion conductor may be poly(ethersulfone), polystyrene, a vinyl-based polymer, poly(vinyl chloride), poly(vinylidene fluoride), poly(tetrafluoroethylene), poly(benzimidazole), or poly(ethylene glycol), each of which is doped with metal hydroxide or the like.

In addition, examples of commercially available ionomers include nafion, Aquivion, and the like.

The ionomer may be present in an amount of 20 to 45% by weight with respect to the total weight of the electrode, specifically 25 to 38% by weight with respect thereto. When the content of the ionomer is less than 20% by weight, the performance of the fuel cell may be deteriorated, and when the content exceeds 45% by weight, aggregation of the ionomer may occur due to an excess thereof.

The method of producing the electrode includes preparing a composition for forming an electrode containing the catalyst and the ionomer and coating the composition for forming an electrode to produce an electrode.

First, a composition for forming an electrode containing the catalyst and the ionomer is prepared.

The composition for forming the electrode may be prepared by adding the catalyst and the ionomer to a solvent and then dispersing the resulting mixture through any one dispersion method selected from ultrasonic dispersion, stirring, 3-roll milling, planetary stirring, high-pressure dispersion and a combination thereof.

In addition, after dispersion in a soaking solution, the catalyst may be mixed with the ionomer or added in a solid state to the ionomer.

The solvent may be a solvent selected from the group consisting of water, a hydrophilic solvent, an organic solvent and a mixture of one or more thereof.

The hydrophilic solvent may have at least one functional group selected from the group consisting of alcohol, ketone, aldehyde, carbonate, carboxylate, carboxylic acid, ether and amide, containing, as a main chain, a straight-chain or branched-chain, saturated or unsaturated hydrocarbon having 1 to 12 carbon atoms. These may contain an alicyclic or aromatic cyclic compound as at least a part of the main chain. Specific examples thereof include: alcohols such as methanol, ethanol, isopropyl alcohol, ethoxy ethanol, n-propyl alcohol, butyl alcohol, 1,2-propanediol, 1-pentanol, 1,5-pentanediol, 1,9-nonanediol and the like; ketones such as heptanone and octanone; aldehydes such as benzaldehyde and tolualdehyde; esters such as methyl pentanoate and ethyl-2-hydroxypropanoate; carboxylic acids such as pentanoic acid and heptanoic acid; ethers such as methoxybenzene and dimethoxypropane; and amides such as propanamide, butylamide and dimethylacetamide.

The organic solvent may be selected from N-methylpyrrolidone, dimethyl sulfoxide, tetrahydrofuran and mixtures thereof.

The solvent may be present in an amount of 80% to 95% by weight based on the total weight of the composition for forming an electrode. When the content of the solvent is less than 80% by weight, there may be a dispersion problem due to cracks and high viscosity during electrode coating due to the excessively high content of solids, and when the content of the solvent is greater than 95% by weight, there may be a disadvantage in terms of electrode activity.

Next, the electrode is produced by coating the composition for forming an electrode.

As a specific example, the producing the electrode may further include coating a release film with the composition for forming an electrode to produce an electrode and transferring the electrode to an ion exchange membrane.

When the release film is coated with the composition for forming the electrode, preferably, the composition for forming the electrode in which the active material is dispersed is continuously or intermittently transferred to a coater, and is then uniformly applied at a dried thickness of 1 μm to 200 μm on the release film.

More specifically, the composition for forming the electrode is continuously transferred to a coater such as a die coater, gravure coater, bar coater or comma coater through a pump depending on the viscosity of the electrode-forming composition, and is then uniformly applied on a decal film such that a dried thickness of an electrode layer is 1 μm to 200 μm, more preferably 3 μm to 20 μm, using a method such as slot die coating, bar coating, comma coating, screen printing, spray coating, doctor-blade coating or brushing, and evaporating the solvent while passing the same through a drying furnace maintained at a constant temperature.

When the composition for forming the electrode is coated to a thickness of less than 1 μm, the activity of the catalyst may be reduced due to the small catalyst content, and when the composition is coated to a thickness exceeding 200 μm, the movement distance of ions and electrons may increase, thereby increasing resistance.

The drying process may be carried out at 25° C. to 90° C. for 12 hours or longer. When the drying temperature is less than 25° C. and the drying time is shorter than 12 hours, there may occur a problem in that a sufficiently dried electrode cannot be formed, and when the drying is conducted at a temperature higher than 90° C., the electrode may crack.

However, the method of applying and drying the composition for forming an electrode is not limited to the above.

Optionally, after drying the composition for forming an electrode to produce the electrode, the method may further include cutting the dried electrode and the release film to a desired size and bonding the same to the ion exchange membrane.

The ion exchange membrane includes an ion conductor. The ion conductor may be a cation conductor having a cation-conducting group such as a proton, or an anion conductor having an anion-conducting group such as a hydroxyl ion, carbonate or bicarbonate. Since the description of the cation conductor and the anion conductor is the same as the description of the ionomer, a repeated description is omitted.

Meanwhile, the ion exchange membrane may take the form of a strengthening membrane in which the ion conductor fills pores in a fluorine-based porous support such as e-PTFE or a porous nanoweb support prepared by electrospinning or the like.

For example, a method of bonding the electrode to the ion exchange membrane may be a transfer method, and the transfer method may be performed by hot pressing including applying heat and pressure to a metal press or to a rubber soft material such as silicone rubber put over a metal press.

The transfer method may be carried out under conditions of 80° C. to 150° C. and 50 kgf/cm$^2$ to 200 kgf/cm$^2$. When hot pressing is performed under the pressure and temperature conditions less than 80° C. and 50 kgf/cm$^2$, respectively, the transfer of the electrode to the release film may not be properly performed, when hot pressing is performed at a temperature higher than 150° C., the polymer of the ion exchange membrane burns and thus the structure of the electrode may be deformed, and when hot pressing is performed at a pressure exceeding 200 kgf/cm$^2$, the effect of pressing the electrode is greater than the effect of transferring the electrode, and thus the transfer may not be performed properly.

The membrane-electrode assembly according to another embodiment of the present disclosure includes an anode and a cathode, which face each other, and the ion exchange membrane, positioned between the anode and the cathode. Any one selected from the group consisting of the anode, the cathode and a combination thereof may include the electrode according to one embodiment of the present disclosure.

The description associated with the electrode, the method of producing the electrode, and the description associated with the ion exchange membrane are the same as those given above, and a repeated description thereof will be omitted.

Figure 5:
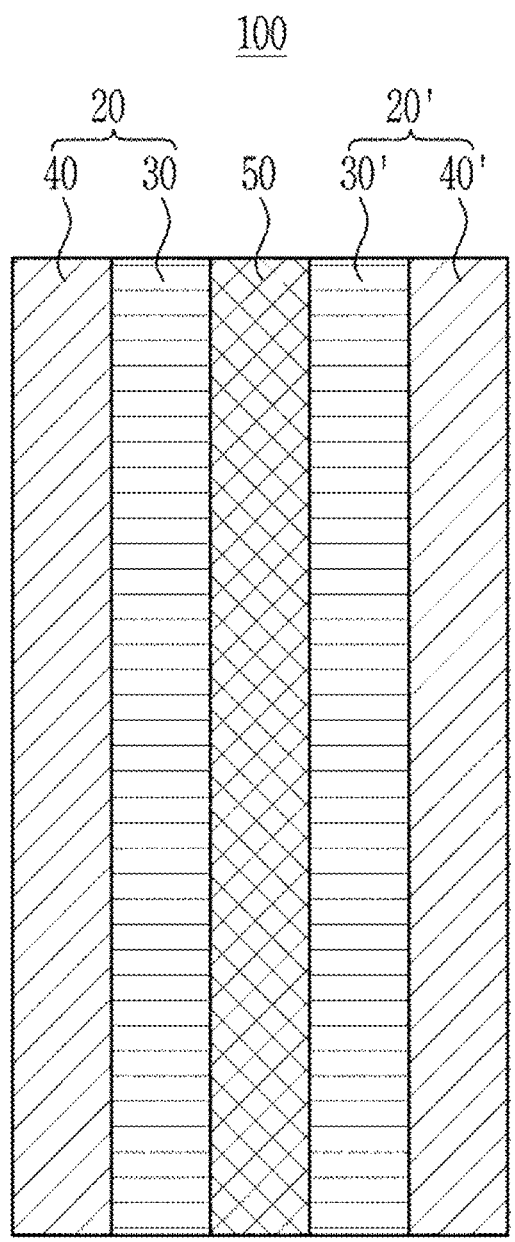
FIG. 5 is a sectional view schematically illustrating a membrane-electrode assembly according to an embodiment of the present disclosure.

FIG. 5 is a sectional view schematically showing the membrane-electrode assembly. Referring to FIG. 5, the membrane-electrode assembly 100 includes the ion exchange membrane 50 and electrodes 20 and 20' disposed on respective surfaces of the ion exchange membrane 50. The electrodes 20 and 20' include electrode substrates 40 and 40' and catalyst layers 30 and 30' formed on the surface of the electrode substrates 40 and 40', and may further include a microporous layer (not shown) including conductive fine particles such as carbon powder and carbon black to facilitate material diffusion in the electrode substrates 40 and 40' between the electrode substrates 40 and 40' and the catalyst layers 30 and 30'.

In the membrane-electrode assembly 100, the electrode 20, which is disposed on one surface of the ion exchange membrane 50 and causes an oxidation reaction to thus generate hydrogen ions and electrons from a fuel transferred through the electrode substrate 40 to the catalyst layer 30, is referred to as an "anode", and the electrode 20', which is disposed on the other surface of the ion exchange membrane 50 and causes a reduction reaction to generate water from the hydrogen ions supplied through the ion exchange membrane 50 and an oxidizing agent transferred through the electrode substrate 40' to the catalyst layer 30', is referred to as a "cathode".

The catalyst layer 30 or 30' of any one electrode 20 or 20' selected from the group consisting of the anode 20, the cathode 20' and a combination thereof includes the electrode according to one embodiment of the present disclosure described above.

The electrode substrates 40 and 40' may be porous conductive substrates to thus ensure the smooth supply of hydrogen or oxygen. Typical examples thereof include a carbon paper, a carbon cloth, a carbon felt or a metal cloth (a porous film including a fibrous metal cloth or a cloth made of polymer fiber including a metal film formed thereon), but are not limited thereto. In addition, the electrode substrates 40 and 40' are preferably waterproofed with a fluorine-based resin in order to prevent deterioration in the reactant diffusion efficiency due to the water that is generated when the fuel cell is operated. Examples of the fluorine-based resin include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene or copolymers thereof.

The membrane-electrode assembly 100 can be produced according to a conventional method of manufacturing a membrane-electrode assembly except that the electrode according to an embodiment of the present disclosure is used as the anode 20 and/or the cathode 20'.

The fuel cell according to another embodiment of the present disclosure includes the membrane-electrode assembly.

Figure 6:
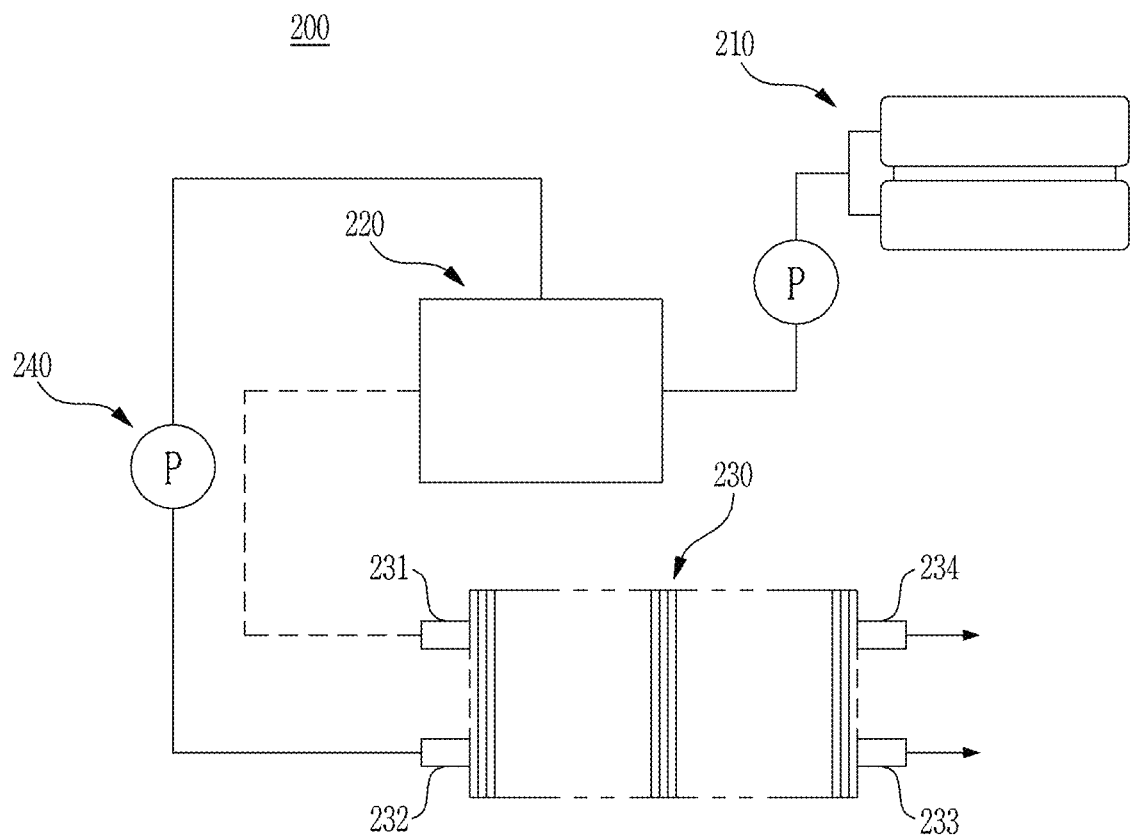
FIG. 6 is a schematic diagram showing the overall configuration of a fuel cell according to an embodiment of the present disclosure.

FIG. 6 is a schematic diagram showing the overall configuration of the fuel cell.

Referring to FIG. 6, the fuel cell 200 includes a fuel feeder 210 for feeding a fuel mixture of a fuel and water and a reformer 220 for reforming the fuel mixture to generate a reforming gas including hydrogen gas, a stack 230 for generating electrical energy through electrochemical reaction between an oxidizing agent and the reforming gas including hydrogen gas supplied from the reformer 220, and an oxidizing agent feeder 240 for feeding the oxidizing agent to the reformer 220 and the stack 230.

The stack 230 includes a plurality of unit cells for generating electrical energy by inducing an oxidation/reduction reaction between the reforming gas including hydrogen gas supplied from the reformer 220 and the oxidizing agent supplied from the oxidizing agent feeder 240.

Each unit cell refers to a cell of a unit for generating electricity, and includes a membrane-electrode assembly for oxidizing/reducing oxygen in the oxidizing agent and the reforming gas including hydrogen gas and a separator plate (also called a "bipolar plate") for feeding the reforming gas including the hydrogen gas and the oxidizing agent to the membrane-electrode assembly. The separator plates are disposed on both sides of the membrane-electrode assembly. Here, the separator plates respectively located at the outermost sides of the stack may be specifically referred to as "end plates".

The one end plate of the separator plate includes a pipe-shaped first supply tube 231 for injecting the reforming gas including hydrogen gas supplied from the reformer 220 and a pipe-shaped second supply tube 232 for injecting oxygen gas, and the other end plate of the separator plate includes a first discharge tube 233 for discharging the remaining unreacted reforming gas including hydrogen gas in the plurality of unit cells to the outside and a second discharge tube 234 for discharging the remaining unreacted oxidizing agent in the unit cell described above to the outside.

The electrode is applicable to various fields such as those of secondary batteries or capacitors, in addition to the membrane-electrode assembly for fuel cells.

Mode for Disclosure

Hereinafter, examples of the present disclosure will be described in more detail such that they can be easily implemented by those skilled in the field to which the present disclosure pertains. However, the present disclosure can be implemented as various embodiments, and is not limited to the examples described herein. In addition, the contents not described herein can be inferred sufficiently technically by those skilled in the art and thus a detailed description thereof is omitted.

EXAMPLE 1

Preparation of Catalyst

EXAMPLE 1

Coating of Catalyst with Co-phthalocyanine 1.0 g of a commercial Pt/C catalyst (TEC10E50E, manufactured by Tanaka) and 0.1 g of Co-phthalocyanine were placed in a reaction vessel. The reaction vessel was placed in a resonant acoustic mixer and the ingredients were mixed at 80 G for 8 minutes to form a coating layer containing Co-phthalocyanine on the Pt/C catalyst surface and thereby to prepare a catalyst.

EXAMPLE 2

Heat Treatment Under Argon Gas of Co-phthalocyanine-Coated Catalyst

The catalyst prepared in Example 1 was spread on an alumina boat, and the alumina boat containing the sample was placed in a heating furnace equipped with a rail. While argon gas was made to flow into the heating furnace, the temperature of the heating furnace was set to 600° C. and the temperature was then raised. When the set temperature was reached, the heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

EXAMPLE 3

Heat Treatment Under Argon-Hydrogen Mixture Gas of Co-phthalocyanine-Coated Catalyst The catalyst prepared in Example 1 was spread on an alumina boat, and the alumina boat containing the sample was placed in a heating furnace equipped with a rail. While argon gas was made to flow into the heating furnace, the temperature of the heating furnace was set to 600° C. and the temperature was then raised. When the set temperature was reached, an argon-hydrogen mixture gas (including 10% by volume of hydrogen) was made to flow. The heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

Comparative Example 1

Commercial Catalyst

A commercial Pt/C catalyst (TEC10E50E, manufactured by Tanaka) was used.

Comparative Example 2

Heat Treatment Under Argon Gas of Co-phthalocyanine

Co-phthalocyanine was spread on an alumina boat, and the alumina boat containing the sample was placed in a heating furnace equipped with a rail. While argon gas was made to flow into the heating furnace, the temperature of the heating furnace was set to 600° C., and the temperature was then raised. When the set temperature was reached, the heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

Comparative Example 3

Heat Treatment Under Argon-Hydrogen Mixture Gas of Co-phthalocyanine

Co-phthalocyanine was spread on an alumina boat, and the alumina boat containing the sample was placed in a heating furnace equipped with a rail. While argon gas was made to flow into the heating furnace, the temperature of the heating furnace was set to 600° C. and the temperature was then raised. When the set temperature was reached, an argon-hydrogen mixture gas (including 10% by volume of hydrogen) was made to flow. The heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

Comparative Example 4

Heat Treatment Under Argon Gas of Mixture of Catalyst and Co-phthalocyanine

A mixture of 1.0 g of a commercial Pt/C catalyst and 0.1 g of Co-phthalocyanine was spread on an alumina boat, and the alumina boat containing the sample was placed in a heating furnace equipped with a rail. While argon gas was made to flow into the heating furnace, the temperature of the heating furnace was set to 600° C. and the temperature was then raised. When the set temperature was reached, the heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

Comparative Example 5

Heat Treatment Under Argon-Hydrogen Mixture Gas of Mixture of Catalyst and Co-phthalocyanine A mixture of 1.0 g of a commercial Pt/C catalyst and 0.1 g of Co-phthalocyanine was spread on an alumina boat, and the alumina boat containing the sample was placed in a heating furnace equipped with a rail. While argon gas was made to flow into the heating furnace, the temperature of the heating furnace was set to 600° C. and the temperature was then raised. When the set temperature was reached, an argon-hydrogen mixture gas (including 10% by volume of hydrogen) was made to flow. The heating furnace was moved to the site where the sample was located, and heat was applied to the sample for 30 minutes. After the set time had elapsed, the heating furnace was moved from the site where the sample was located to the original position, the heating furnace was completely cooled, and the catalyst was then recovered.

Comparative Example 6

0.1 g of a 20 wt % Pt/C (HISPEC, A Johnson Matthey Company) catalyst was mixed with 100 ml of an ethylenediamine aqueous solution, and the resulting mixture was stirred under reflux at 75° C. for 8 hours. Then, a suspension containing a mixture of the catalyst and the aqueous ethylenediamine solution was filtered using a vacuum filter while washing with distilled water and ethanol, and dried in an oven at 60° C. for 8 hours. Then, the powdery catalyst was recovered. The dried catalyst was heat-treated in a heating furnace under an argon gas atmosphere for 2 hours to prepare a Pt/C catalyst (ED-treated 20% Pt/C) having a protective layer containing a carbon material doped with nitrogen, formed to a thickness of 1 nm.

Comparative Example 7

A catalyst was prepared in the same manner as in Example 1, except that the catalyst was prepared by coating a carbon support with Co-phthalocyanine and then supporting Pt on the Co-phthalocyanine-coated carbon support in Example 1.

Experimental Example 1

Transmission Electron Microscope Observation of Prepared Catalyst

Figure 7:
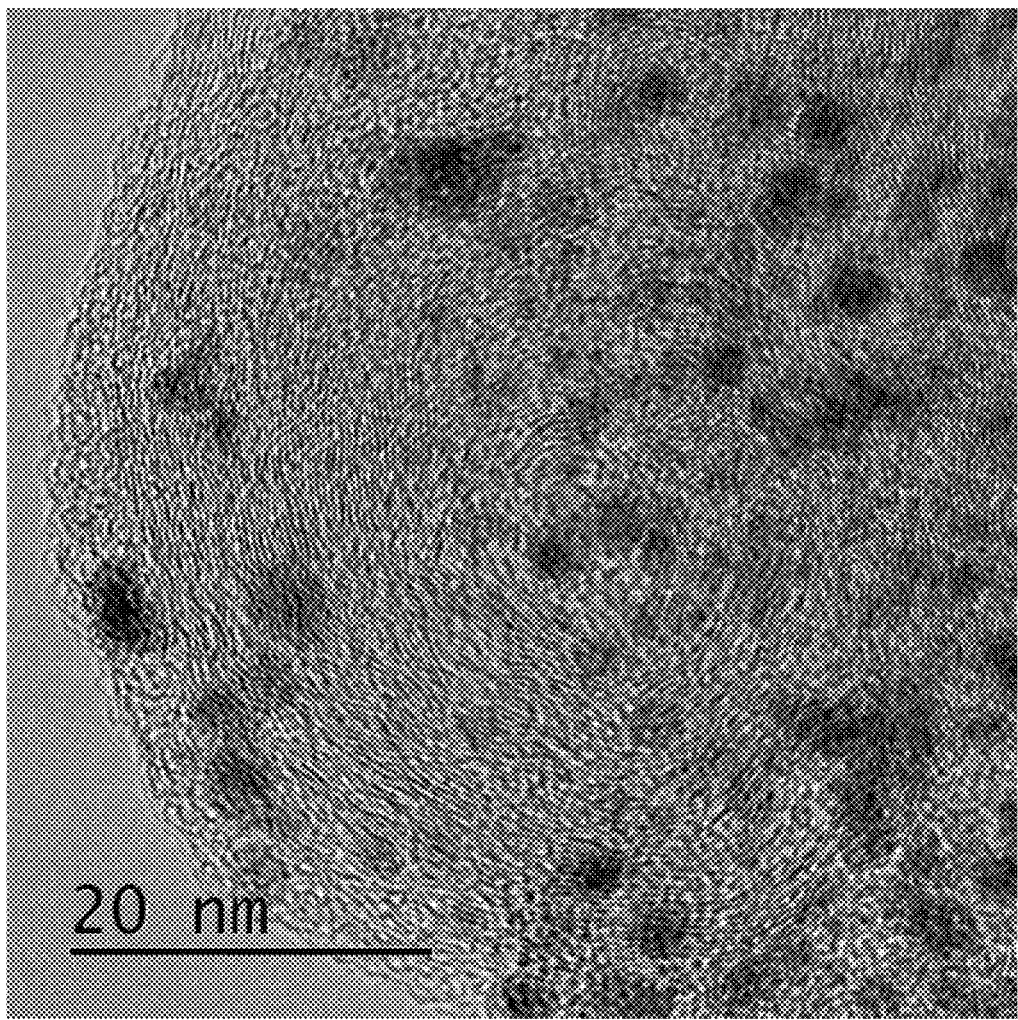
FIGS. 7 and 8 are transmission electron microscope (TEM) images showing a coated catalyst prepared in Example 1 of the present disclosure before heat-treatment.
Figure 8:
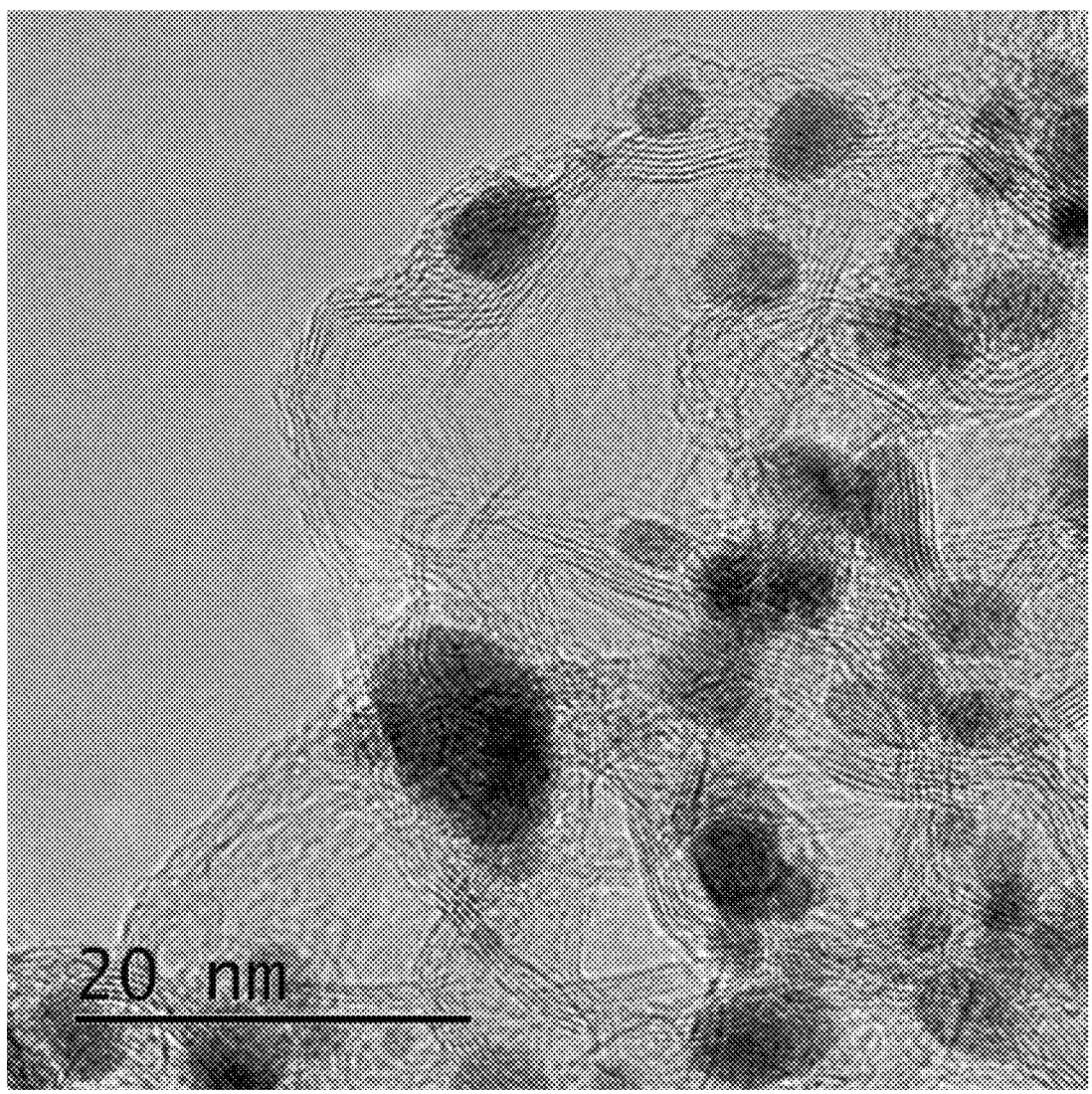

Transmission electron microscopy (TEM) images of the coated catalyst before heat treatment prepared in Example 1 are shown in FIGS. 7 to 8. FIG. 7 shows the result of coating the TEC10E50E product of Tanaka Corp. of Example 1 with Co-phthalocyanine, and FIG. 8 shows the result of coating a high-durability support with Co-phthalocyanine in the same manner as in Example 1.

As can be seen from FIGS. 7 to 8, Co-phthalocyanine is uniformly coated to a thin thickness on the surface of the Pt/C catalyst. In addition, as can be seen from FIG. 8, Co-phthalocyanine can be easily coated on other catalysts utilizing a high-durability support using the method of the present disclosure.

Figure 9:
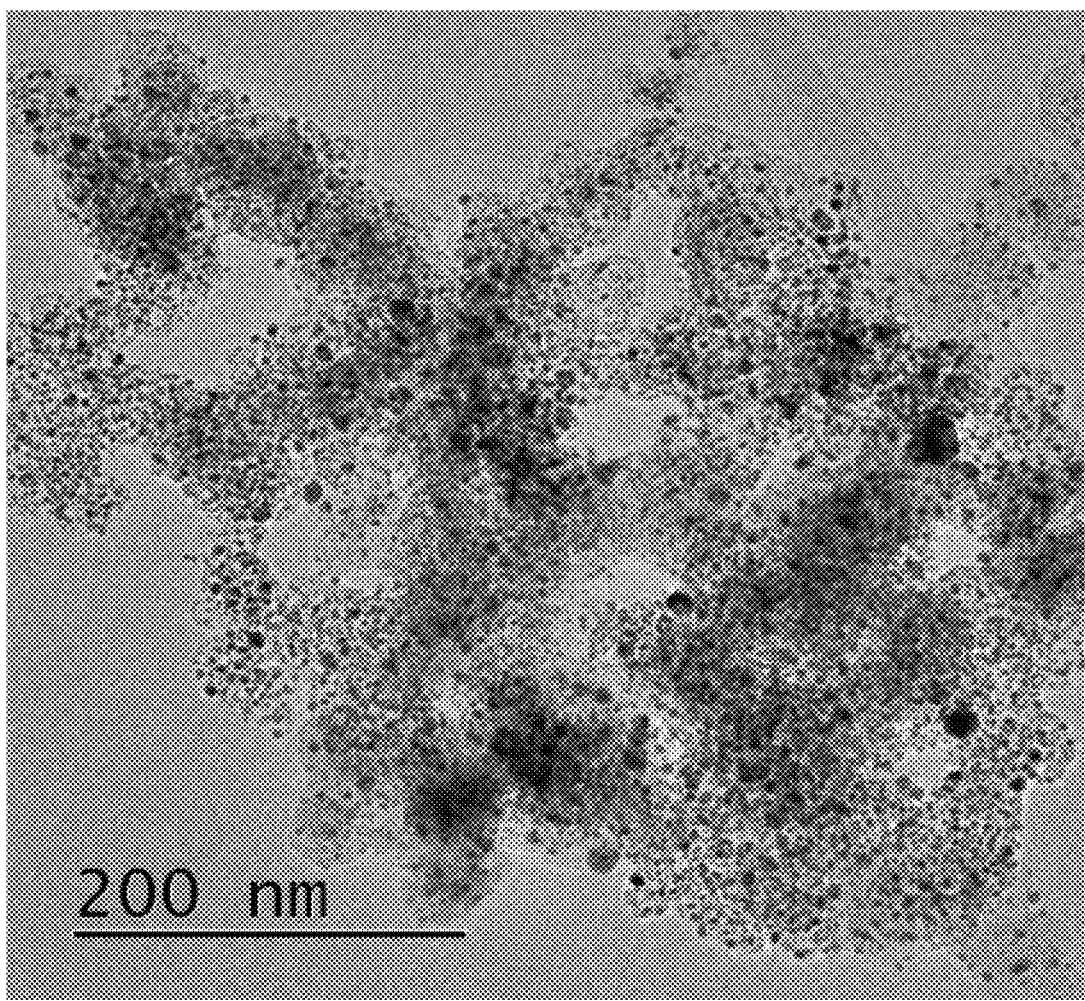
FIG. 9 is a transmission electron microscope (TEM) image showing a commercial catalyst used in Example 1 of the present disclosure.
Figure 10:
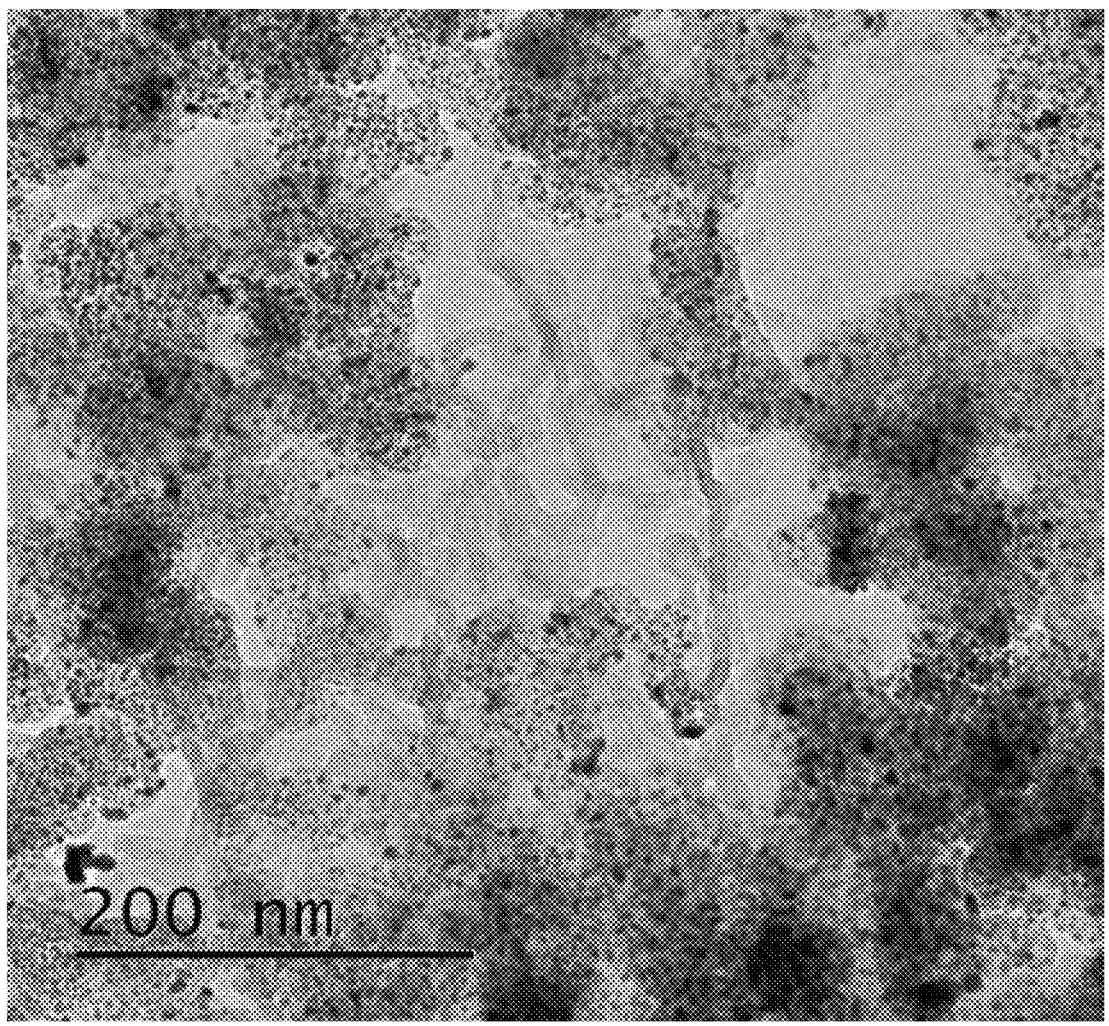
FIG. 10 is a transmission electron microscope (TEM) image showing a catalyst prepared in Example 3 of the present disclosure.

In addition, FIG. 9 is a transmission electron microscope (TEM) image of the TEC10E50E product of Tanaka Corp., used in Example 1, and FIG. 10 is a transmission electron microscope (TEM) image of the catalyst prepared in Example 3.

As can be seen from FIGS. 9 and 10, by the heat treatment, the Co-phthalocyanine was carbonized, so that a carbonized coating layer containing carbon doped with a hetero element was formed, and at the same time, any one selected from the group consisting of carbon nanofibers, carbon nanotubes and a mixture thereof was formed on all or part of the surface of the carbonized coating layer.

Figure 11:
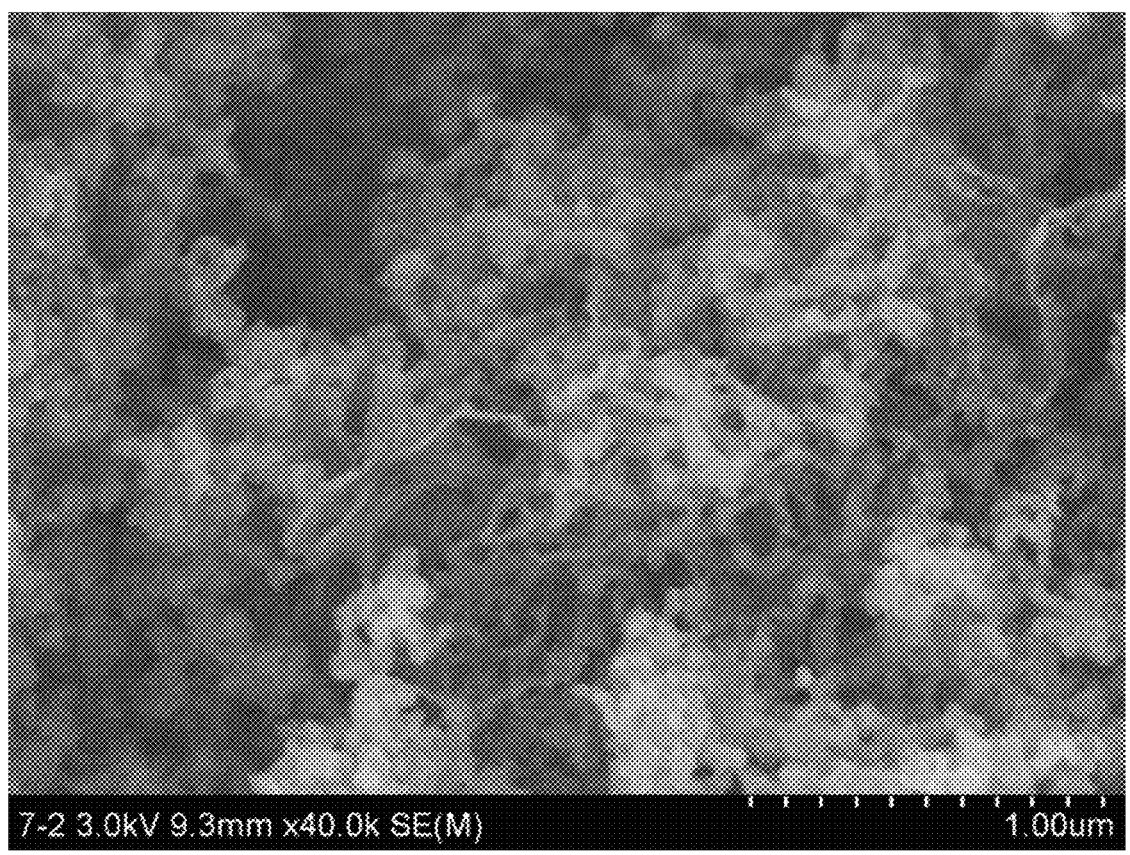
FIG. 11 is a scanning electron microscope (SEM) image showing a catalyst prepared under an argon atmosphere in Example 2 of the present disclosure.
Figure 12:
FIG. 12 is a scanning electron microscope (SEM) image showing a catalyst prepared under an argon-hydrogen mixture gas atmosphere in Example 3 of the present disclosure.

In addition, a scanning electron microscope (SEM) image of the catalyst prepared under an argon atmosphere in Example 2 and a scanning electron microscope (SEM) image of the catalyst prepared under an argon-hydrogen mixture gas atmosphere in Example 3 are shown in FIGS. 11 and 12, respectively.

As can be seen from FIGS. 11 and 12, any one selected from the group consisting of carbon nanofibers, carbon nanotubes and a mixture thereof formed on all or part of the surface of the carbon coating layer containing carbon doped with a hetero element has a larger diameter, is longer and has a clear shape under an argon-hydrogen mixture gas atmosphere.

Experimental Example 2

CV Cyclovoltammetry Evaluation

The catalysts prepared in Examples and Comparative Examples were added to a solution prepared by mixing an ionomer with isopropanol, and the resulting mixture was sonicated to prepare a composition for forming an electrode.

The composition for forming an electrode was applied to a rotating disk electrode made of a glassy carbon material and dried to prepare a working electrode (active area of 0.196 cm$^2$).

Electrochemical properties were analyzed in 1M HClO$_4$ electrolyte solution using an electrochemical measuring device using an Ag/AgCl electrode as a working electrode and a reference electrode and a platinum wire as a counter electrode.

Figure 13:
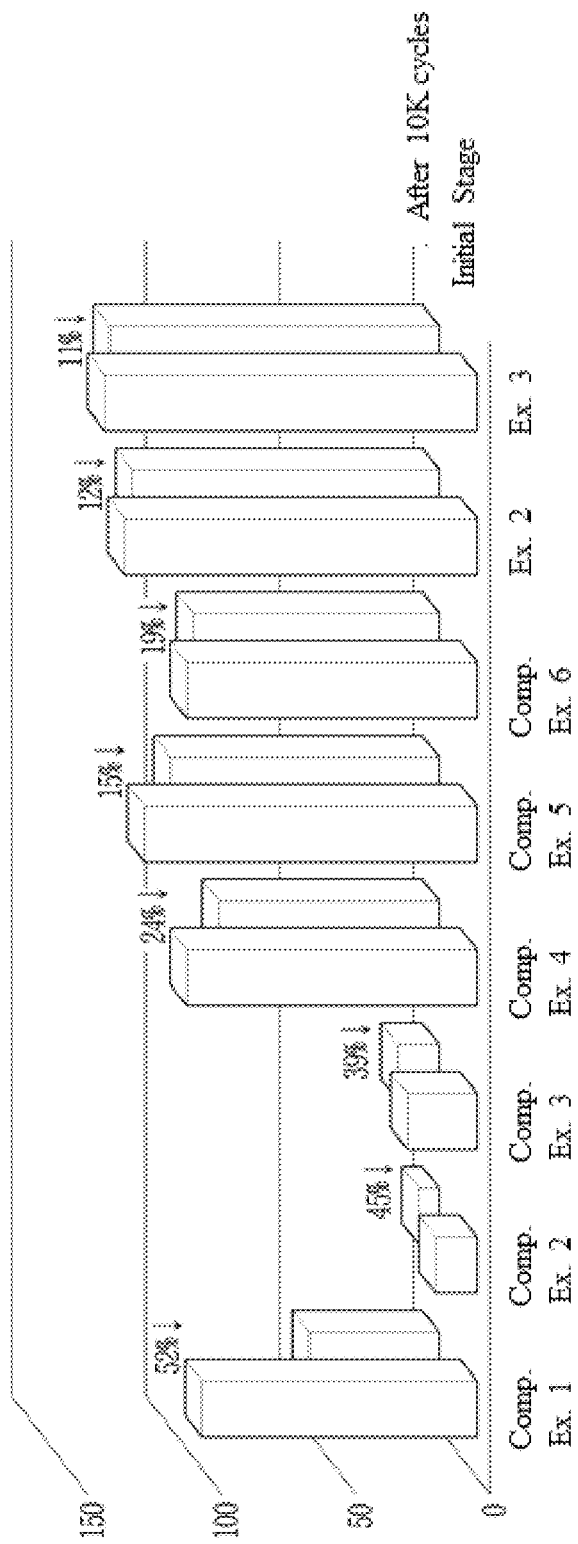
FIG. 13 is a graph showing the change in a catalytically active area in the initial stage and after 10,000 cycles in CV (cyclovoltammetry) measured in Experimental Example 2 of the present disclosure.

10,000 cyclovoltammetry (CV) cycles were performed using each catalyst prepared above. At this time, the change rate of the catalytically active area before and after the cycles was measured and the results are shown in Table 1 and FIG. 13 below.

TABLE 1

| Sample | Catalytically active area decrease (%) |
|---|---|
| Comp. Ex. 1 | 52% |
| Ex. 1 | 46% |
| Ex. 2 | 12% |
| Ex. 3 | 11% |

As can be seen from Table 1, the catalysts prepared in Examples have smaller catalytically active area decrease rates after 10,000 cycles compared to Comparative Example 1 (commercial catalyst) and thus exhibit improved catalyst durability, and even in the case where only the coating layer containing Co-phthalocyanine is formed, as in Example 1, an effect of increasing durability can be obtained, and an effect of improving durability after heat treatment, especially in Examples 2 and 3, can be significantly improved. In addition, as can be seen from FIG. 13, the catalysts prepared in Examples above exhibit larger initial catalytically active areas than the catalysts prepared in Comparative Examples. In addition, as a result of evaluating the durability of the catalyst through comparison of the catalytically active area after performing 10,000 CV cycles, durability was increased in the order of Example 3>Example >Comparative Example 5>Comparative Example 4>Comparative Example 6>Comparative Example 1.

For reference, in the case of Comparative Example 6, because the coating layer is formed through a wet method, there is a possibility that the catalyst activity may be lowered due to the effect of desorption and growth of metal particles during treatment with ethylenediamine, and the recovery rate of the catalyst may be inhibited. The reason for the poor results is considered to be that any one selected from the group consisting of carbon nanofibers, carbon nanotubes and a mixture thereof is not contained in all or part of the surface of the carbon coating layer.

Experimental Example 3

ORR (Oxygen Reduction Reaction) Evaluation

A mixture of a commercial Pt/C catalyst (commercial catalyst) and the catalyst prepared in Example 3 was added to a solution prepared by mixing an ionomer with isopropanol, and the resulting mixture was sonicated to prepare a composition for forming an electrode. At this time, the catalyst (CoPc) prepared in Example above was mixed therewith in amounts of 0% by weight, 20% by weight, and 10% by weight.

The composition for forming an electrode was applied to a rotating disk electrode made of a glassy carbon material and dried to prepare a working electrode (active area of 0.196 cm$^2$).

Electrochemical properties were analyzed in 1M HClO$_4$ electrolyte solution using an electrochemical measuring device using an Ag/AgCl electrode as a working electrode and a reference electrode and a platinum wire as a counter electrode.

Cyclovoltammetry (CV) and oxygen reduction reaction (ORR) activity were measured using the electrochemical measuring device, and measurement was performed under conditions of a scan range of 0.05 V to 1.0 V (vs RHE) and a scan rate of 10 mV·s$^{-1}$. In addition, during the measurement, the rotational speed of the disk electrode was maintained at 1,600 rpm, and saturation of the electrolyte solution with oxygen was maintained as pretreatment for the oxygen reduction reaction experiment, and the results of the measured CV (cyclovoltammetry) are shown in FIG. 14 and the results of the ORR evaluation are shown in FIG. 15.

Figure 14:
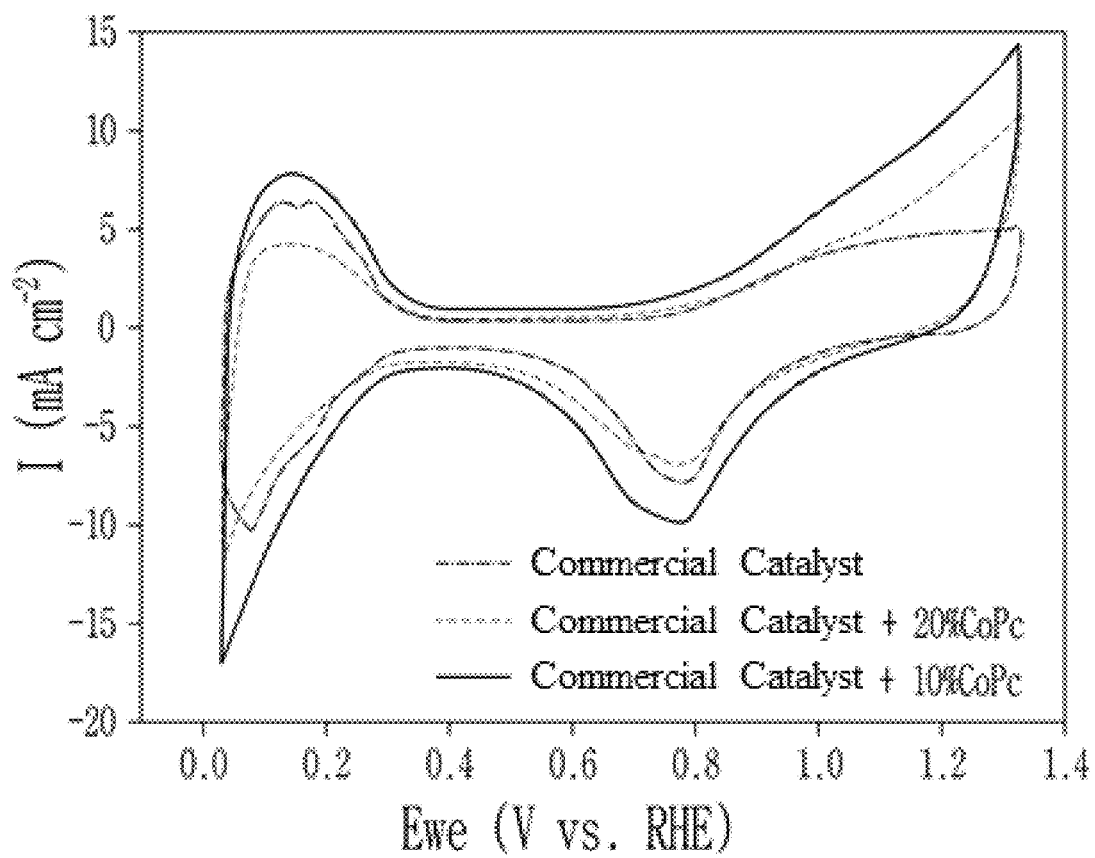
FIG. 14 is a graph showing CV (cyclo-voltammetry) measured in Experimental Example 3 of the present disclosure.
Figure 15:
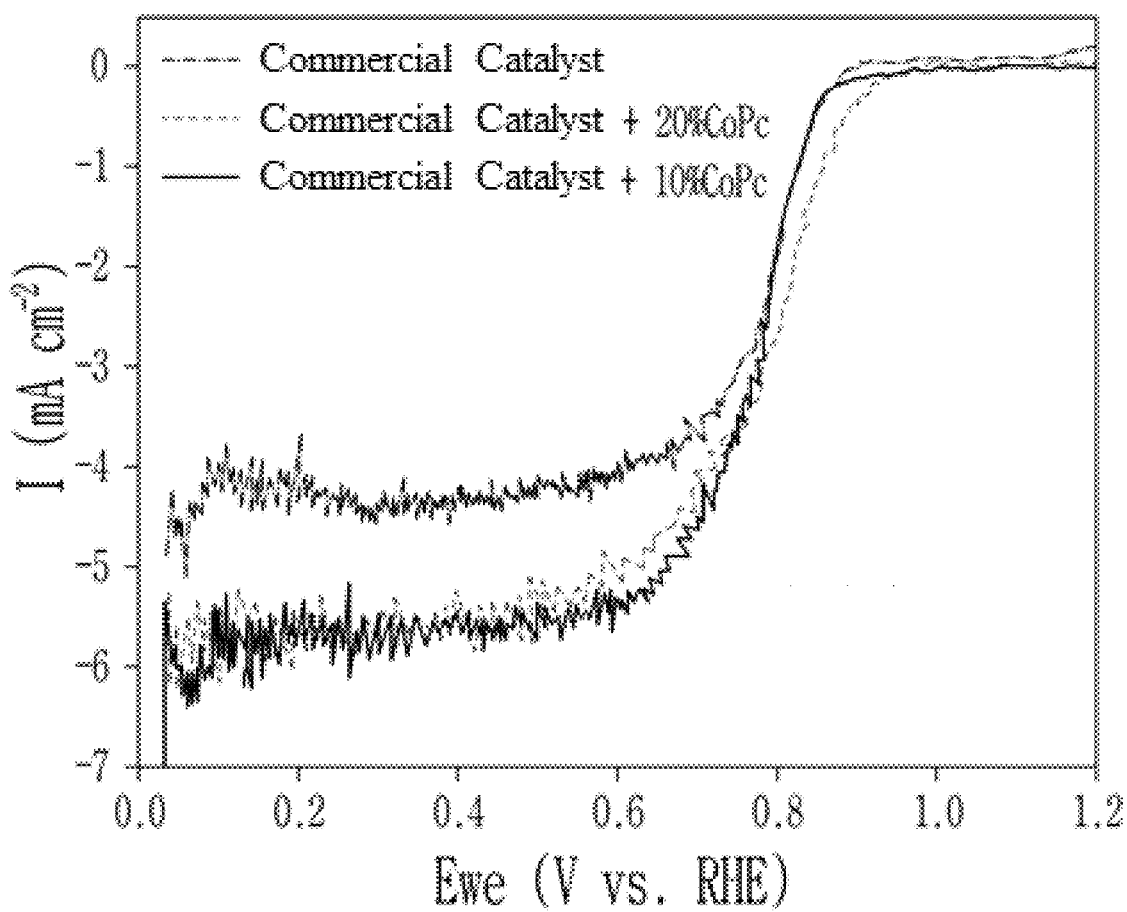
FIG. 15 is a graph showing the result of an ORR (oxygen reduction reaction) measured in Experimental Example 3 of the present disclosure.

Referring to FIGS. 14 and 15, the CV (cyclovoltammetry) and ORR (oxygen reduction reaction) evaluation results of the catalysts formed with carbon nanofibers prepared under an argon-hydrogen mixture gas among the catalysts showed that the activity of the catalyst changes according to the ratio of Co-phthalocyanine.

Experimental Example 4

MEA Manufacturing and Initial Performance Evaluation 420 parts by weight of water and 100 parts by weight of the catalyst prepared in Example above were placed into a vial and the catalyst was soaked through a stirring process to remove bubbles in the catalyst.

750 parts by weight of an ionomer solution (Nafion 5% solution, manufactured by DuPont) was added to the solution, and was uniformly mixed by stirring and ultrasonic dispersion to prepare a catalyst slurry composition.

The catalyst slurry composition was bar-coated on a polyimide release film under the conditions of a coating speed of 10 mm/s and a coating thickness of 100 μm, followed by drying at 30° C. for 6 hours to produce an electrode.

The dried electrode was cut to the required size, the electrode surface and the electrolyte membrane were aligned on both surfaces of the polymer electrolyte membrane (manufactured by DuPont, Nafion 212 Membrane) such that they face each other, and then the structure was hot-pressed by pressing under heat and pressure conditions of 100° C. and 10 MPa for 5 minutes and allowing the structure to stand at room temperature for 1 minute, and transferred to a release film, and the release film was peeled therefrom to produce a membrane-electrode assembly.

The initial performance of the produced membrane-electrode assembly was measured after supplying a fuel at a fixed flow rate on the basis of 0.6 V and performing activation at a cycle of changing a voltage in the OCV range of 0.3 V at 65° C. and at atmospheric pressure, and the results are shown in Table 2 below.

TABLE 2

| Sample | OCV (V) | Current Density (mA/cm²) | | |
|---|---|---|---|---|
| | | @ 0.75 V | @ 0.60 V | @ 0.30 V |
| Comp. Ex. 1 | 0.984 | 430 | 1261 | 1689 |
| Comp. Ex. 4 | 0.985 | 425 | 1270 | 1714 |
| Comp. Ex. 5 | 0.985 | 436 | 1283 | 1730 |
| Comp. Ex. 6 | 0.975 | 360 | 1210 | 1614 |
| Ex. 2 | 0.985 | 490 | 1340 | 1832 |
| Ex. 3 | 0.990 | 497 | 1360 | 1914 |

As can be seen from Table 2, in Comparative Examples and 6, wherein the catalyst and Co-phthalocyanine were mixed and then heat-treated, the performance was improved. The reason for this is considered to be that carbon nanofibers or carbon nanotubes were grown through heat treatment after the catalyst was coated with Co-phthalocyanine, thereby improving mass transfer characteristics and performance.

Experimental Example 5

Figure 16:
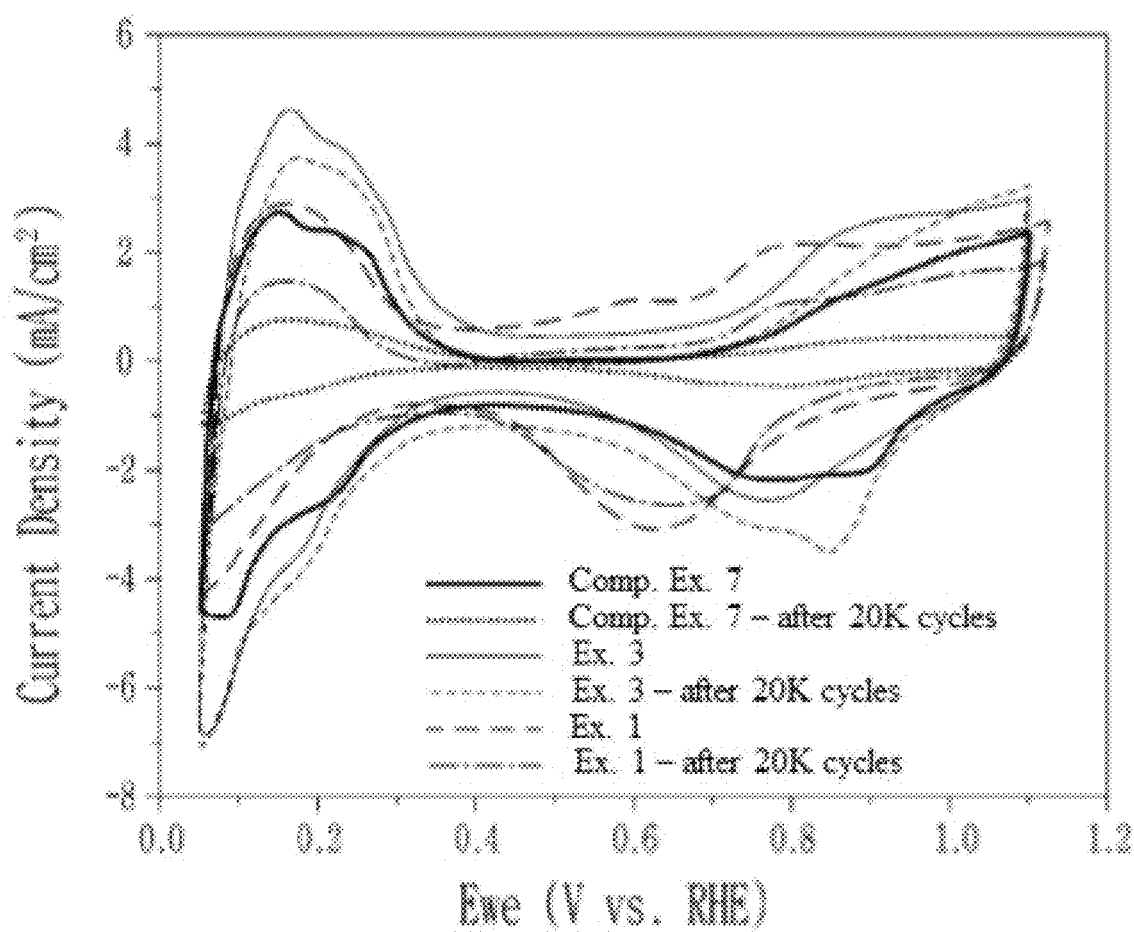
FIG. 16 is a graph showing a CV (cyclo-voltammetry) measured in Experimental Example 5 of the present disclosure.

For the catalysts prepared in Example 1, Example 3 and Comparative Example 7, CV (cyclovoltammetry) was performed in the same manner as in Experimental Example 3, and the results are shown in FIG. 16. The CV is data showing the oxidation-reduction reaction polarization curve of the catalyst measured using cyclovoltammetry (CV). Specifically, the oxidation-reduction reaction activity was measured after 10,000 and 20,000 cyclovoltammetry (CV) cycles in the range from 0.6 V to 1.1 V.

As can be seen from FIG. 16, the result of evaluation of the durability of the catalysts through comparison of the catalytically active area after performing 20,000 CV cycles showed that Example 3, Example 1, and Comparative Example 7 exhibited performance decreases of about 11%, about 45% and about 57%, respectively. Therefore, Example 3 and Example 1 exhibited excellent durability compared to Comparative Example 7.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

DESCRIPTION OF REFERENCE NUMERALS

1: Support
2: Metal particle
3: Coating layer containing any one selected from the group consisting of phthalocyanine, M-phthalocyanine and mixture thereof
4: Carbon coating layer containing carbon doped with hetero element
5: Any one selected from the group consisting of carbon nanofibers, carbon nanotubes and mixture thereof
20, 20': Electrodes
30, 30': Catalyst layers
40, 40': Electrode substrates
50: Ion exchange membrane
100: Membrane-electrode assembly
200: Fuel cell
210: Fuel feeder 220: Reformer
230: Stack 231: First supply tube
232: Second supply tube 233: First discharge tube
234: Second discharge tube 240: Oxidizing agent feeder

INDUSTRIAL AVAILABILITY

The present disclosure provides a catalyst, a method of preparing the same, an electrode including the same, a membrane-electrode assembly, and a fuel cell. The catalyst is imparted with improved durability by forming a coating layer on the surface of a commercially available catalyst or a conventional catalyst through a relatively easy method without a separate treatment, is imparted with further improved durability by forming a carbon coating layer through post-treatment of the catalyst including the coating layer, and is imparted with improved mass transfer ability and performance through carbon nanofibers or carbon nanotubes produced during the post-treatment process.

The invention claimed is:

1. A catalyst comprising:
   a support;
   a metal particle supported on the support; and
   a coating layer disposed on a surface of the metal particle and a surface of the support,
   wherein the coating layer comprises:
   a carbon coating layer; and
   any one selected from the group consisting of carbon nanofibers, carbon nanotubes and a mixture thereof disposed on all or part of a surface of the carbon coating layer,
   wherein a content of the coating layer is 5% to 30% by weight based on a total weight of the catalyst,
   wherein the coating layer is formed by carbonizing M-phthalocyanine, wherein M is a transition metal, such that the coating layer includes (i) nitrogen doped therein in an amount of 3 to 10 atomic % with respect to the coating layer and (ii) the transition metal doped therein in amount of 1 to 3 atomic % with respect to the coating layer,
   wherein the carbon coating layer has a thickness of 0.1 to 7 nm, and
   wherein the carbon nanofibers or carbon nanotubes have a length of 50 nm to 5,000 nm.

2. The catalyst according to claim 1, wherein the any one selected from the group consisting of carbon nanofibers, carbon nanotubes and a mixture thereof is one grown from the carbon coating layer.

3. The catalyst according to claim 1, wherein the transition metal M of the M-phthalocyanine is any one selected from the group consisting of Fe, Co, Cu, Ti, Ni, Zn, Mn and a combination thereof.

4. The catalyst according to claim 1, wherein a content of the any one selected from the group consisting of carbon nanofibers, carbon nanotubes and a mixture thereof is 1% to 10% by weight based on a total weight of the catalyst.

5. A composition for forming an electrode, the composition comprising:
   a first catalyst which is the catalyst according to claim 1;
   a second catalyst which is different from the first catalyst;
   an ionomer; and
   a solvent.

6. A method for preparing a catalyst, the method comprising:
   mixing a metal particle supported on a support with M-phthalocyanine, thereby coating the M-phthalocyanine on a surface of the metal particle and a surface of the support, wherein M is a transition metal; and heat-treating the M-phthalocyanine in such a way that (i) a coating layer comprising a carbon coating layer and any one selected from the group consisting of carbon nanofibers, carbon nanotubes and a mixture thereof grown from the carbon coating layer is formed through a carbonization thereof, (ii) a content of the coating layer is 5% to 30% by weight based on a total weight of the catalyst, (iii) the coating layer includes nitrogen doped therein in an amount of 3 to 10 atomic % with respect to the coating layer and the transition metal doped therein in an amount of 1 to 3 atomic % with respect to the coating layer, (iv) the carbon coating layer has a thickness of 0.1 to 7 nm, and (v) the carbon nanofibers or carbon nanotubes have a length of 50 nm to 5,000 nm.

7. The method according to claim 6, wherein the mixing comprises mixing the metal particle supported on the support with M-phthalocyanine in a solid phase by means of any one selected from the group consisting of a ball mill, a powder mixer and a resonant acoustic mixer.

8. The method according to claim 7, wherein:
the mixing is carried out by means of the resonant acoustic mixer which conducts resonant vibratory mixing by applying a low-frequency acoustic energy to the metal particle supported on the support and the M-phthalocyanin, the low-frequency acoustic energy has a frequency of 10 to 100 Hz, and
the resonant vibratory mixing is carried out for 30 seconds to 30 minutes by applying an acceleration of 10 to 100 G to the metal particle supported on the support and the M-phthalocyanine.

9. The method according to claim 6, wherein the heat treatment is carried out at 400° C. to 800° C. for 5 minutes to 60 minutes.

10. The method according to claim 6, wherein the heat treatment is carried out under an argon or argon-hydrogen ($H_2$-Ar) atmosphere.

11. An electrode comprising:
the catalyst according to claim 1; and
an ionomer.

12. A membrane-electrode assembly comprising:
an anode and a cathode facing each other; and
an ion exchange membrane interposed between the anode and the cathode,
wherein any one selected from the group consisting of the anode, the cathode and a combination thereof comprises the electrode according to claim 11.

13. A fuel cell comprising the membrane-electrode assembly according to claim 12.

* * * * *